(12) United States Patent
Amir

(10) Patent No.: US 12,507,941 B2
(45) Date of Patent: Dec. 30, 2025

(54) DEVICES AND METHODS FOR REDUCING ANXIETY AND TREATING ANXIETY DISORDERS

(71) Applicant: San Diego State University (SDSU) Foundation, San Diego, CA (US)

(72) Inventor: Nader Amir, San Diego, CA (US)

(73) Assignee: SAN DIEGO STATE UNIVERSITY (SDSU) FOUNDATION, San Diego, CA (US)

( * ) Notice: Subject to any disclaimer, the term of this patent is extended or adjusted under 35 U.S.C. 154(b) by 687 days.

(21) Appl. No.: 17/096,368

(22) Filed: Nov. 12, 2020

(65) Prior Publication Data

US 2021/0338140 A1    Nov. 4, 2021

Related U.S. Application Data

(60) Provisional application No. 62/934,408, filed on Nov. 12, 2019.

(51) Int. Cl.
| | |
|---|---|
| *A61B 5/00* | (2006.01) |
| *A61B 5/055* | (2006.01) |
| *A61B 5/16* | (2006.01) |
| *A61B 5/291* | (2021.01) |
| *A61B 5/297* | (2021.01) |
| *A61B 5/31* | (2021.01) |
| *A61B 5/315* | (2021.01) |
| *A61B 5/372* | (2021.01) |
| *A61B 5/375* | (2021.01) |

(Continued)

(52) U.S. Cl.
CPC .............. *A61B 5/375* (2021.01); *A61B 5/055* (2013.01); *A61B 5/165* (2013.01); *A61B 5/291* (2021.01); *A61B 5/297* (2021.01); *A61B 5/31* (2021.01); *A61B 5/315* (2021.01); *A61B 5/372* (2021.01); *A61B 5/378* (2021.01); *A61B 5/38* (2021.01); *A61B 5/384* (2021.01); *A61B 5/386* (2021.01); *A61B 5/398* (2021.01); *A61B 5/486* (2013.01); *A61B 5/72* (2013.01); *G16Y 40/20* (2020.01)

(58) Field of Classification Search
None
See application file for complete search history.

(56) References Cited

U.S. PATENT DOCUMENTS

| | | | |
|---|---|---|---|
| 2003/0073921 A1* | 4/2003 | Sohmer | A61B 5/378 600/544 |
| 2005/0043646 A1* | 2/2005 | Viirre | A61B 5/375 600/544 |

(Continued)

OTHER PUBLICATIONS

Moser et al. On the relationship between anxiety and error monitoring: a meta-analysis and conceptual framework. Frontiers in Human Neuroscience. Aug. 15, 2013. (Year: 2013).*

(Continued)

*Primary Examiner* — Etsub D Berhanu
(74) *Attorney, Agent, or Firm* — Gregory P. Einhorn; Greer, Burns & Crain, Ltd.

(57) ABSTRACT

In alternative embodiments, provided are products of manufacture, including devices and integrated systems, and methods, for reducing error-related negativity (ERN) and anxiety, and for treating or ameliorating Anxiety Disorders such as Generalized Anxiety Disorder (GAD) or Social Anxiety Disorder (SAD) and obsessive-compulsive disorder (OCD).

13 Claims, 18 Drawing Sheets

(51) Int. Cl.
*A61B 5/377* (2021.01)
*A61B 5/378* (2021.01)
*A61B 5/38* (2021.01)
*A61B 5/384* (2021.01)
*A61B 5/386* (2021.01)
*A61B 5/398* (2021.01)
*G16Y 40/20* (2020.01)

(56) References Cited

U.S. PATENT DOCUMENTS

| | | | | |
|---|---|---|---|---|
| 2007/0173733 | A1* | 7/2007 | Le | A61B 5/369 600/544 |
| 2009/0124921 | A1* | 5/2009 | Milgramm | A61B 5/16 600/544 |
| 2014/0020089 | A1* | 1/2014 | Perini | G06F 21/32 726/19 |
| 2015/0297109 | A1* | 10/2015 | Garten | A61B 5/316 600/28 |
| 2016/0235323 | A1* | 8/2016 | Tadi | A61B 5/1128 |

OTHER PUBLICATIONS

Miltner et al. Event-Related Brain Potentials Following Incorrect Feedback in a Time-Estimation Task: Evidence for a "Generic" Neural System for Error Detection. Journal of Cognitive Neuroscience 9:6, pp. 788-798. (Year: 1997).*

Olvet et al. The effect of trial-to-trial feedback on the error-related negativity and its relationship with anxiety. Cognitive, Affective, & Behavioral Neuroscience. 2009, 9 (4), 427-433. (Year: 2009).*

Meyer. Developing Psychiatric Biomarkers: a Review Focusing on the Error-Related Negativity as a Biomarker for Anxiety. Current Treatment Options in Psychiatry (2016) 3:356-364. (Year: 2016).*

Tan et al. The error-related negativity for error processing in interoception. NeuroImage 184 (2019) 386-395. (Year: 2019).*

Masaki et al., "Feedback-Related Electroencephalogram Oscillations of Athletes With High and Low Sports Anxiety" Frontiers in Psychology, 2018, v 9, article 1420, p. 1-9.

Spüler et al., "Error-related potentials during continuous feedback: using EEG to detect errors of different type and severity" Frontiers in Human Neuroscience, 2015, v 9, article 155, p. 1-10.

Wang et al., "Error-related negativity and error awareness in a Go/No-go task" Scientific Reports, 2020, v 10.

* cited by examiner

Incongruent (left) and congruent (right) flanker trials

DEVICES AND METHODS FOR REDUCING ANXIETY AND TREATING ANXIETY DISORDERS

RELATED APPLICATIONS

This U.S. Utility Patent Application claims the benefit of priority under 35 U.S.C. § 119(e) of U.S. Provisional Application Ser. No. 62/934,408, filed Nov. 12, 2019. The aforementioned application is expressly incorporated herein by reference in its entirety and for all purposes.

STATEMENT AS TO FEDERALLY SPONSORED RESEARCH

This invention was made with government support under Contract No. R01MH106477 awarded by the National Institutes of Health. The government has certain rights in the invention.

TECHNICAL FIELD

This invention generally relates to neuroscience. In alternative embodiments, provided are products of manufacture, including devices and integrated systems, and methods, for reducing error-related negativity (ERN) and anxiety, and for treating or ameliorating Anxiety Disorders such as Generalized Anxiety Disorder (GAD) or Social Anxiety Disorder (SAD) and obsessive-compulsive disorder (OCD).

BACKGROUND

Past research indicates that anxiety in individuals accompanies increased error-related negativity (ERN). ERN is a component of event-related (brain) potential (ERP). ERP is the recorded electrical activity in the brain tied to a specific event in time, such as a visual stimulus or an error committed in a test.

ERP is measured through electroencephalography (EEG). EEG is a form of electrophysiological monitoring method to record electrical activity of the brain. Usually, electrodes are placed on the scalp which measure voltage fluctuations within brain neurons. Neurons are brain cells that transmit information through electrical and chemical signals in the brain.

Anxiety disorders are the most prevalent DSM condition affecting the general population with 33% of individuals meeting the criteria for at least one anxiety disorder during their lives. These disorders interfere with social[18] and occupational functioning as well as life satisfaction[19]. Effective treatments exist for these disorders including cognitive behavioral therapy (CBT) and medication[20,21]. However, 50% of those who receive treatment do not respond[22] and many do not receive treatment. Thus, despite the clear need for effective treatments many people do not have access to them or choose not to receive services. This may be in part due to prohibitive costs of treatments as well as lack of trained mental health professionals. Furthermore, symptoms overlap across anxiety disorders and there are often additional comorbidities. However, most empirically-based treatments were developed to treat a specific disorder in the absence of others, and few focus on risk factors that cross diagnostic boundaries. Thus, there is a need for theory-driven, research-based, alternative treatments that can cross diagnostic categories, focus on risk factors, and bridge some of the barriers to receiving treatment.

SUMMARY

In alternative embodiments, provided are products of manufacture, devices and systems for reducing error-related negativity (ERN) and anxiety, comprising use of a neurofeedback mechanism system on an individual in need thereof to reduce error-related negativity (ERN) and anxiety. In alternative embodiments, feedback results are accrued by the product of manufacture or device, and the feedback results are fed or transmitted to a remote computer for analysis.

In alternative embodiments, provided are methods for reducing error-related negativity (ERN) and anxiety comprising use of a product of manufacture, device or system as provided herein, wherein an individual operatively connected to the product of manufacture, device or system receives data input from the product of manufacture, device or system, and makes a selection, which is fed or transmitted to a computer for analysis, and the individual receives feedback, optionally the individual receives immediate feedback in real time. In alternative embodiments, the feedback results are fed or transmitted to a remote computer for analysis.

In alternative embodiments, provided are products of manufacture, devices or systems for reducing error-related negativity (ERN), worry and/or anxiety, comprising a neurofeedback mechanism system, wherein the neurofeedback mechanism is used on an individual in need thereof to reduce error-related negativity (ERN), worry and/or anxiety, and/or treating or ameliorating an anxiety disorder or obsessive-compulsive disorder (OCD), and/or treating or ameliorating the anxiety or worry in an individual in need thereof, wherein the neurofeedback mechanism system comprises:
an electro-encephalography (EEG) apparatus an electro-encephalography (EEG) apparatus, a functional magnetic resonance imaging (fMRI), and/or a vertical electrooculogram (EOG) operatively linked to a computer and to the individual, wherein the EEG, fMRI and/or EOG is capable of measuring reactions or responses by the individual to visual or aural cues or stimuli transmitted by the computer, and the EEG, fMRI and/or EOG transmits the reactions or responses by the individual back to the computer,
wherein the computer is capable of giving visual or aural cues or stimuli to the individual, and receiving EEG, fMRI and/or EOG data back from the individual, and giving feedback to the individual in response to the EEG, fMRI and/or EOG data and/or the individuals responses to the visual or aural cues or stimuli, and
a feedback mechanism that allows the individual to communicate with the computer, where optionally the feedback mechanism comprises use of a mouse operatively linked to the computer, and the feedback mechanism allows the computer to communicate with the individual after analysis of the individual's reaction to visual or aural cues or stimulus, wherein optionally the computer feedback to the individual is visual or aural.

In alternative embodiments, of the products of manufacture, devices or systems, the feedback results are accrued by the product of manufacture or device, or the computer, and the feedback results are fed or transmitted to a remote computer for analysis.

In alternative embodiments, provided are methods for reducing error-related negativity (ERN), worry and/or anxiety, and/or treating or ameliorating an anxiety disorder or obsessive-compulsive disorder (OCD) in an individual in need thereof, comprising use of a product of manufacture, device or system of claim 1, the method comprising:

(a) operatively connecting an individual to the product of manufacture, device or system such that the individual receives data input from the product of manufacture, device or system, wherein optionally the data input to the individual is a visual image or an aural stimulus, and optionally the data input is sent or transmitted to the individual by used of a computer screen or headphones, whereupon the individual makes a selection or a feedback response based on the data input, (b) feeding or transmitting the individual's selection or feedback response and/or the individual's reaction to the data input to the computer for analysis, and (c) transmitting from the computer positive or negative feedback to the individual based on the selection by the individual, wherein the feedback is a physical, visual or aural feedback, and optionally the individual receives immediate feedback in real time.

In alternative embodiments of methods as provided herein:

the feedback results are fed or transmitted to a remote computer for analysis;

the individual's reaction to the data input is monitored or read by an electro-encephalography (EEG) apparatus, functional magnetic resonance imaging (fMRI), and/or a vertical electrooculogram (EOG);

the EEG comprises 32 active electrodes: Fp1, Fz, F3, F7, FT9, FCS, FC1, C3, T7, TP9, CP5, CP1, P3, P7, O1, Oz, O2, P4, P8, TP10, CP6, CP2, Cz, C4, T8, FT10, FC6, FC2, F4, F8, and Fp2, using a subset of the International 10-20 system, referenced to Cz and with a ground electrode placed at FPz;

the vertical electrooculogram (EOG) is recorded using two electrodes placed above and below an eye, optionally the left eye, to detect eye blinks;

the EEG is filtered using an anti-aliasing low pass filter at 130 Hz and digitized at 500 Hz with 24 bits of resolution;

the EEG data is re-referenced to the average of TP9 and TP10 (optionally located adjacent to the mastoids) and band-pass filter between 0.1 and 30 Hz, comprising a non-causal Butterworth impulse response function, half-amplitude cut-off, and 12 dB/oct roll-off;

the EEG data are segmented for each trial beginning 500 milliseconds (ms) prior to the response and continuing for 1000 ms post-response, and optionally the data is baseline corrected using a time period −500 ms to −300 ms prior to the response;

the individual has an anxiety disorder or obsessive-compulsive disorder (OCD), and the feedback to the individual by the computer in response to the stimulus or cues from the computer result in the individual's reduces the level of error-related negativity (ERN) and/or anxiety or worry; and/or the anxiety disorder is Generalized Anxiety Disorder (GAD) or Social Anxiety Disorder (SAD), and reducing the error-related negativity (ERN), worry and/or anxiety by use of the product of manufacture, device or system treats or ameliorates the GAD, SAD and/or OCD.

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference in their entireties for all purposes.

DESCRIPTION OF DRAWINGS

The drawings set forth herein are illustrative of exemplary embodiments provided herein and are not meant to limit the scope of the invention as encompassed by the claims.

Figures are described in detail herein.

FIG. 7A graphically illustrates the Correlation between ERN and worry (PSWQ) Average ERN in the overall sample in high (red) and Low (green) worries, and FIG. 7B graphically illustrates average ERN in the overall sample; as further described in Example 2, below.

Like reference symbols in the various drawings indicate like elements.

DETAILED DESCRIPTION

Figure 1:
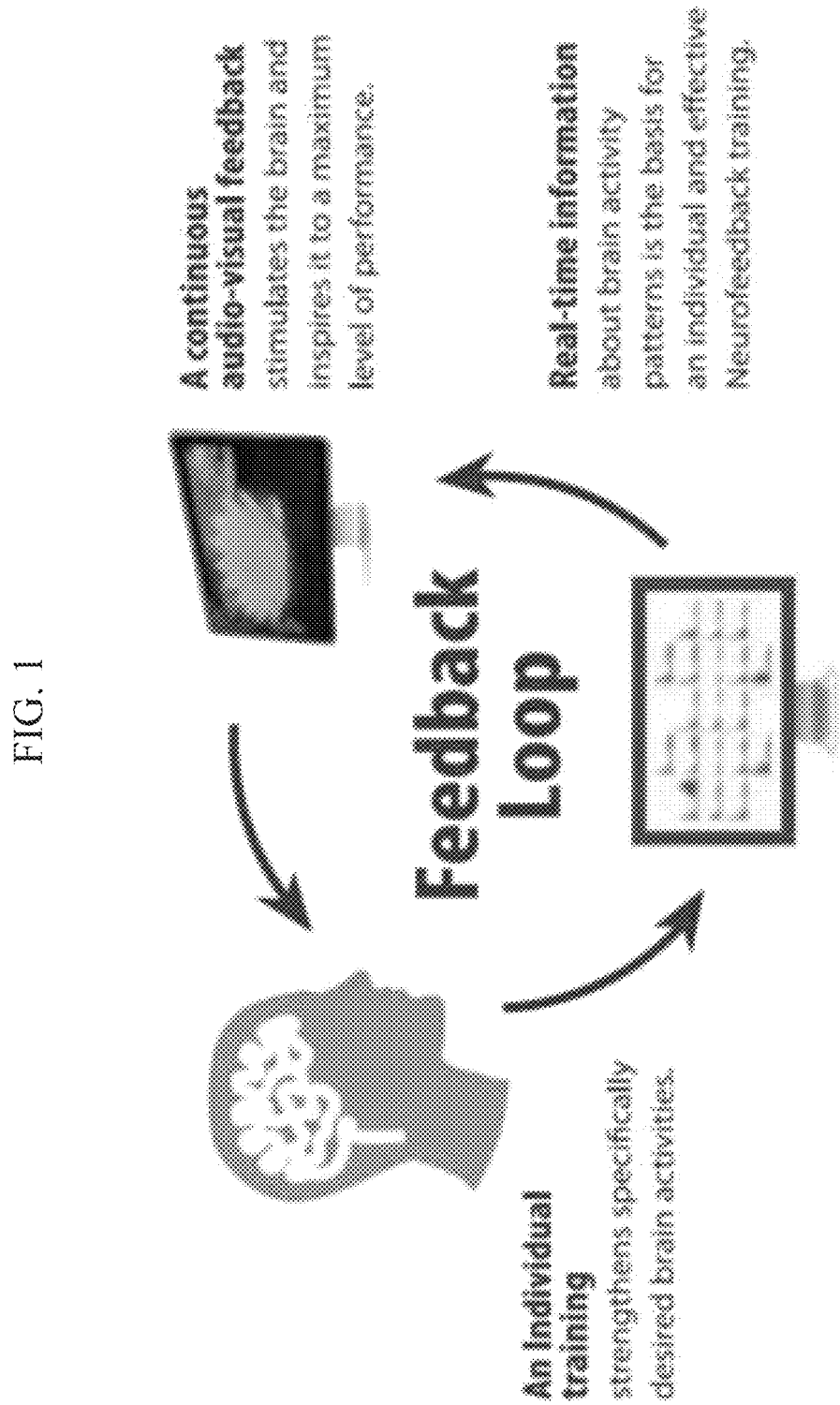
FIG. 1 schematically illustrates an exemplary neurofeedback process as provided herein, as measured by products of manufacture such as devices and methods as provided herein.

In alternative embodiments, provided are products of manufacture, including devices, and kits, and methods, for reducing error-related negativity (ERN), worry and anxiety, and for treating or ameliorating Anxiety Disorders such as Generalized Anxiety Disorder (GAD) or Social Anxiety Disorder (SAD) and obsessive-compulsive disorder (OCD).

Provided herein is a neurofeedback system. called adaptive attentional bias modification (AABM), that provides individuals with real-time electro-encephalography (EEG) data on the individual's error-related negativity during certain tasks. Products of manufacture, including devices, and kits, and methods use neurofeedback as a method to teach individuals to regulate their own brain activity and brain function by "feeding back" to them, or showing them, their brain activity in real-time.

In alternative embodiments, the products of manufacture, including devices, and kits, and methods, as provided herein are used remotely, for example, by remote computer or by phone, or a customized device such as a wrist-worn device, for reducing error-related negativity (ERN) and anxiety.

In contrast to Biofeedback (BF), which uses psychophysiological techniques for monitoring and modifying signals from the peripheral nervous system (for example, heart rate), the neurofeedback (NF) systems, devices and methods as provided herein monitor and modify signals from the central nervous system (CNS) with the goal of effecting behavioral changes.

In alternative embodiments, the products of manufacture, including devices, and kits, and methods, as provided herein monitor and manipulate Event Related Potentials (ERPs), and these can provide a better target for NF as they show more sensitive predictive power in relation to psychopathology (see for example, Cavanagh & Shackman, 2015). The error-related negativity (ERN) as monitored and manipulated by products of manufacture, including devices, and kits, and methods, as provided herein, is ideal for NF as it can be a biomarker for anxiety, and individual differences in anxiety are related to lower ERN amplitude (see for example, Olvet and Hajcak, 2008; Simons, 2010; Weinberg et al., 2012b).

We examined and confirmed the stability and modifiability of the ERN as target of neurofeedback (NF) in anxiety, as explained in Example 1, below.

Electro-Encephalography (EEG), Functional Magnetic Resonance Imaging (fMRI), Vertical Electrooculogram (EOG)

In alternative embodiments, methods and systems as provided herein comprise use of an electro-encephalography (EEG) apparatus, functional magnetic resonance imaging (fMRI), and/or a vertical electrooculogram (EOG), wherein an individual's reaction to a data input is monitored or read by the EEG, fMRI and/or EOG, and these readings are then transmitted back to a computer for analysis, which in turn provides feedback to the individual.

Methods and systems as provided herein can use any form of EEG, fMRI and/or EOG, or apparatus or methods for practicing EEG, fMRI and/or EOG, known in the art, for example, as described in: U.S. Pat. No. 9,814,426, which teaches a mobile wearable electromagnetic brain activity monitor; U.S. Pat. No. 10,821,293, which teaches systems and methods for neuro-EEG synchronization therapy; U.S. Pat. No. 10,799,139, which teaches method and systems for EEG signal processing; U.S. Pat. No. 10,524,683, which teaches a brain-machine interface apparatus and methods; U.S. Pat. No. 10,441,189, which teaches high definition EEG; U.S. Pat. No. 10,130,278, which teaches a wireless EEG unit; U.S. Pat. No. 10,750,972, which teaches systems and methods for wavelet based head movement artifact removal from electrooculography (EOG) signals; U.S. Pat. No. 9,955,895, which teaches a wearable head-mounted, glass-style computing device with EOG acquisition and analysis for human-computer interface; U.S. Pat. No. 9,924,889, which teaches fMRI apparatus and methods.

Computers and Computer Systems

Systems and methods as provided herein use apparatus such as computers and storage memory systems for performing the operations as provided herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays used to practice systems and methods as provided herein are not inherently related to any particular computer or other apparatus. Various general-purpose systems may be used with programs in accordance with the teachings herein, or it may prove convenient to construct a more specialized apparatus to perform the method steps. The structure for a variety of these systems will appear from the description provided herein. In addition, embodiments provided herein are not described with reference to any particular programming language. It will be appreciated that a variety of programming languages may be used to implement and practice methods and systems as described herein.

In alternative embodiments, data generated and processed by components of systems and methods as provided herein, include generated data and programs used to practice embodiments as provided herein, are stored and processed using a machine-readable medium, which can includes any mechanism for storing or transmitting information in a form readable by a machine, for example, a computer. For example, a machine-readable medium includes a machine-readable storage medium (for example, read only memory ("ROM"), random access memory ("RAM"), magnetic disk storage media, optical storage media, flash memory devices, etc.), a machine-readable transmission medium (electrical, optical, acoustical or other form of propagated signals, for example, carrier waves, infrared signals, digital signals, and the like.

In alternative embodiments, programs used to process methods and/or systems as provide herein are cloud-based and use wireless systems to communicate (for example, device-to-device (D2D) connectability) with a user (for example, an individual being treated using systems or methods as provided herein) and/or an operator (for example, a person monitoring and/or administering methods or systems as provided herein as they are being practiced, for example, as described in U.S. Pat. No. 10,834,769, which teaches methods by one or more processors for managing a wireless communication network and device-to-device (D2D) connectability.

In alternative embodiments, systems or methods as provided herein use cloud computing to enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a user or manager of systems or methods as provided herein.

In alternative embodiments, provided herein is a non-transitory, machine-readable medium, comprising executable instructions that, when executed by a processing system including a processor, facilitate performance of operations, the operations comprising a program used to practice methods or systems as provided herein, for example, the MOMENT™ program, which can comprise: 1) removing DC-offset, 2) re-referencing the signals to the average of the mastoid electrodes, 2) band pass filtering the data removing frequencies outside the range of 0.01 to 30 Hz, 3) conducting artifact rejection (for example, +/−50 mV moving window and +/−200 simple voltage), 4) epoching the data (−500 ms to 1000 ms) to the windows surround the response, 5) scoring the ERN.

In alternative embodiments, systems and methods as provided herein use handheld devices and/or Bluetooth transmissions to practice embodiments as provided herein, for example, as described in U.S. Pat. No. 10,834,764.

Products of Manufacture and Kits

Provided are products of manufacture and kits for practicing systems and methods as provided herein; and optionally, products of manufacture and kits can further comprise instructions for practicing methods as provided herein. For example, products of manufacture and kits can comprise programs used to practice methods and systems as provided herein.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About (use of the term "about") can be understood as within 20%, 19%, 18%, 17%, 16%, 15%, 14%, 13%, 12% 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

The invention will be further described with reference to the examples described herein; however, it is to be understood that the invention is not limited to such examples.

EXAMPLES

Example 1: Exemplary Neurofeedback Systems

This example demonstrates that products of manufacture, including devices, and kits, and methods, can be effective for reducing error-related negativity (ERN) and anxiety.

Figure 2:
FIG. 2 schematically illustrates an exemplary visual stimulus or cue as provided to an individual, in this example the stimulus or cue is a set of congruent and incongruent flanking arrows, as further described in Example 1, below.

Methods:

Flanker task (see for example, Erickson and Erickson, 1974): Participants indicate the direction of a center arrow surrounded by congruent or incongruent flanking arrows (see FIG. 2).

Error-related negativity: (ERN) a negative deflection in the ERP that peaks approximately 50 milliseconds (ms) after the commission on an error.

Establishing stability: We examined the stability of ERN when no feedback is provided by collecting data from 135 individuals who completed 330 trials of the flanker task.

Level: increase in mean amplitude voltage in the 100 ms after the commission of an error.

Establishing feasibility of changing the ERN using data in individuals who completed the same flanker task and were given neurofeedback (NF) every 30 trials.

Figure 3:
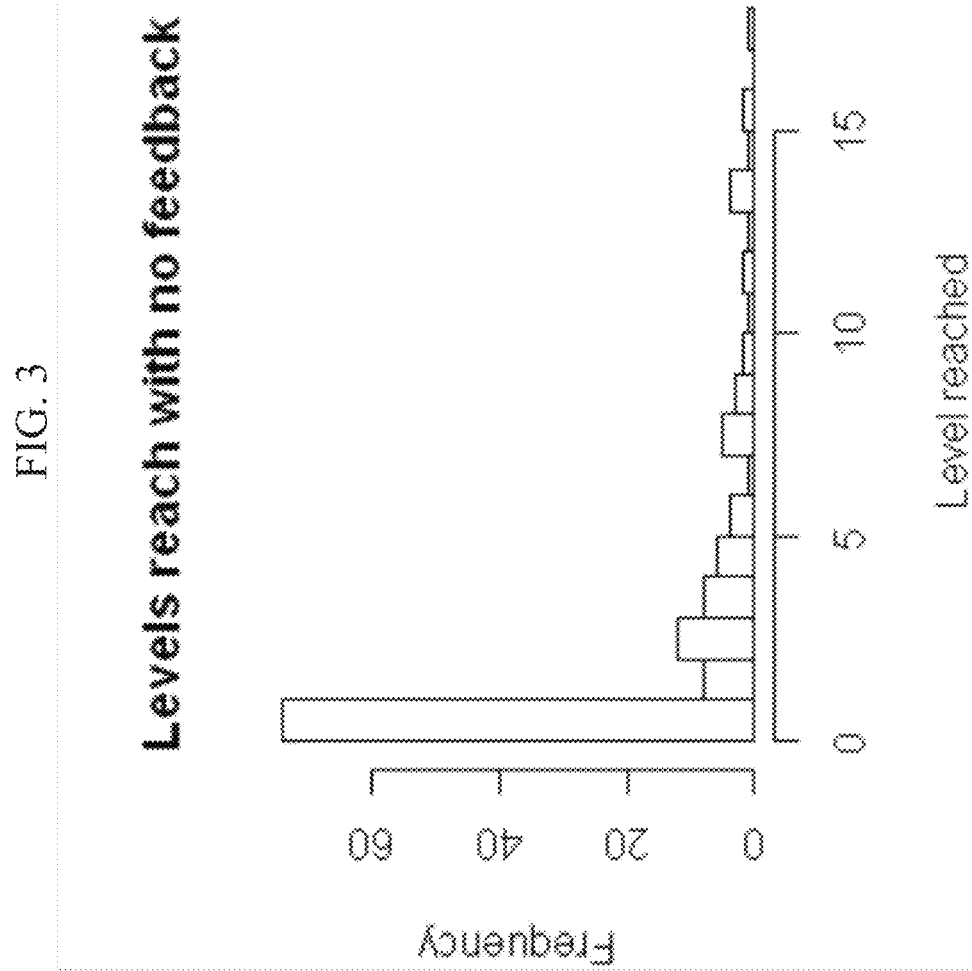
FIG. 3 graphically illustrates levels reached in an individual with no feedback, using frequency as a function of level reached, as further described in Example 1, below.

Hardware:
  BrainVision ActiChamp with Active Electrodes [Brain Products GmbH. Gilching, Germany]
  Sites used: Fp1, Fp2, Fz, M1, M2, Cz using 10/20 system (see for example, Homan et al., 1987)
Online Data Acquisition and Analysis
  Acquisition: 500 Hz, Online reference Cz (Cz and Fz are 'ground' or 'common' reference points for all EEG and EOG electrodes)
  Lab Streaming Layer (Delorme et al., 2011)
  Filtering: Baseline correction, 30 Hz low-pass filter, inversion
Results:
No Feedback:
  Establishing stability: Consistent with previous research, ERN showed stability in the sample who did not receive feedback. Specifically, the average ERN for the first 6 errors was correlated with the average ERN for the last 6 errors (r=0.78, p<0.001).
  Change in Level: With no feedback ERN increased on average by 3.1 levels (sd=4.3); defined as change in the positive direction of the average value of the ERN (the mean amplitude voltage in the 100 ms after the commission of an error) (see FIG. 3, FIG. 4A-B).

Changing the ERN with Feedback:

We provide preliminary data in 5 individuals who complete the same flanker task but were provided feedback on their level after every 30 trials. In this group ERN increased.

Figure 4A:
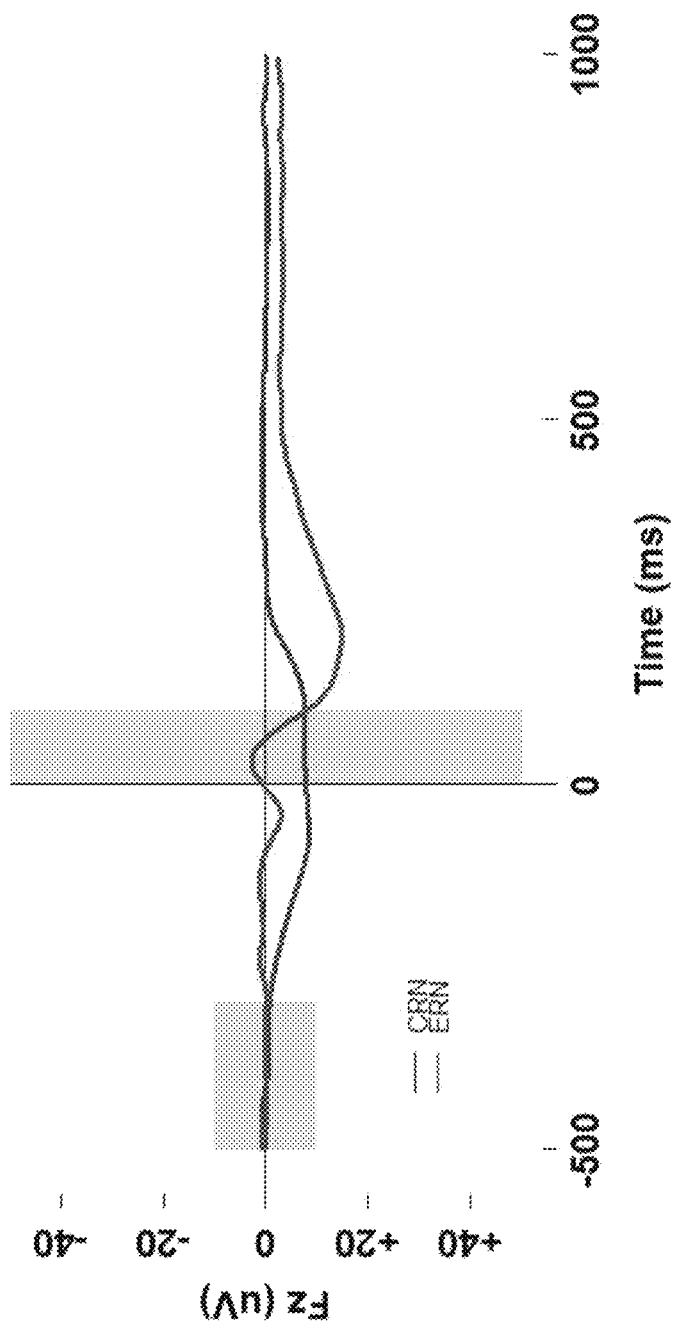
FIG. 4A-B each graphically illustrate error-related negativity (ERN) change in an individual with no feedback, as further described in Example 1, below.
Figure 4B:
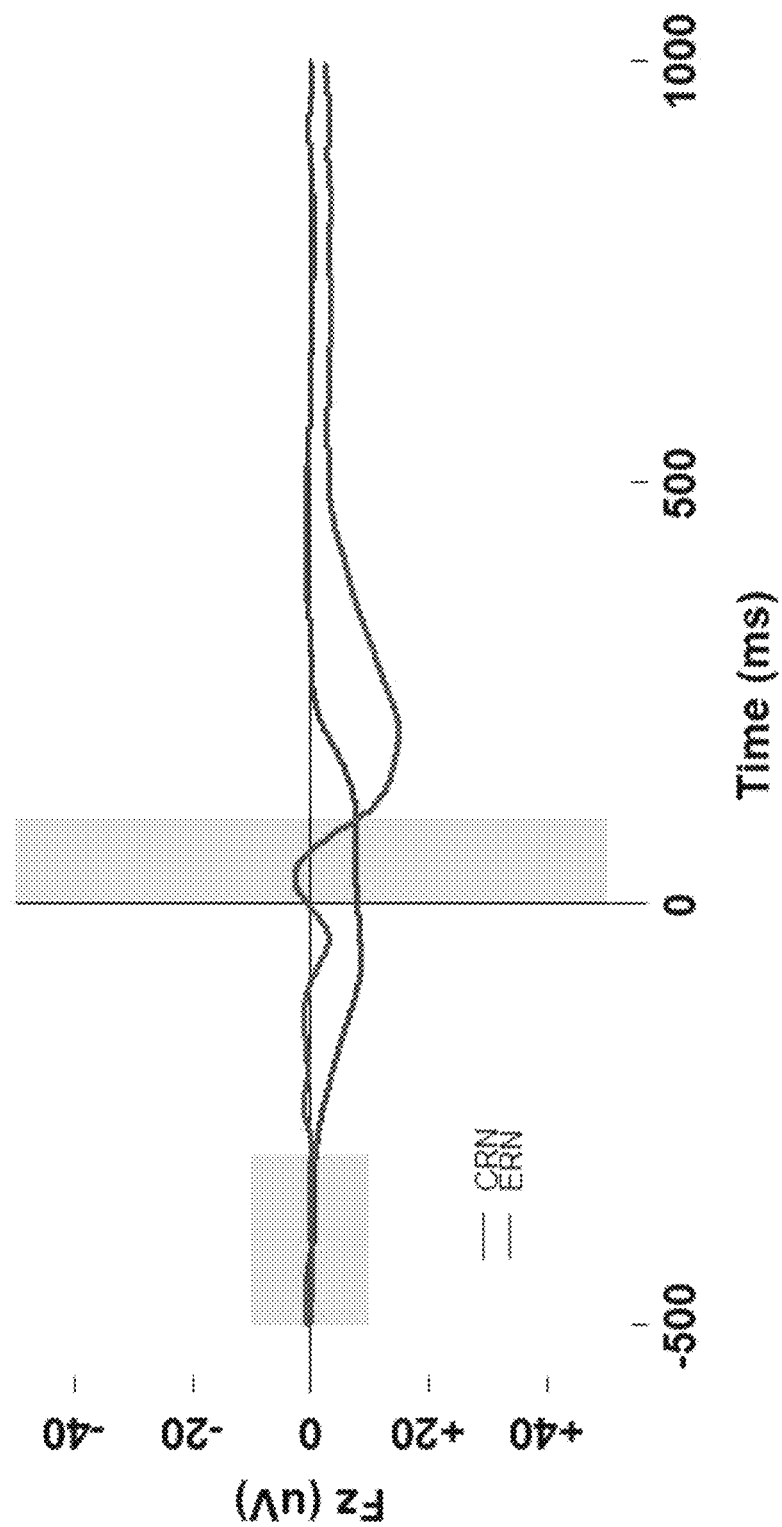
Figure 5A:
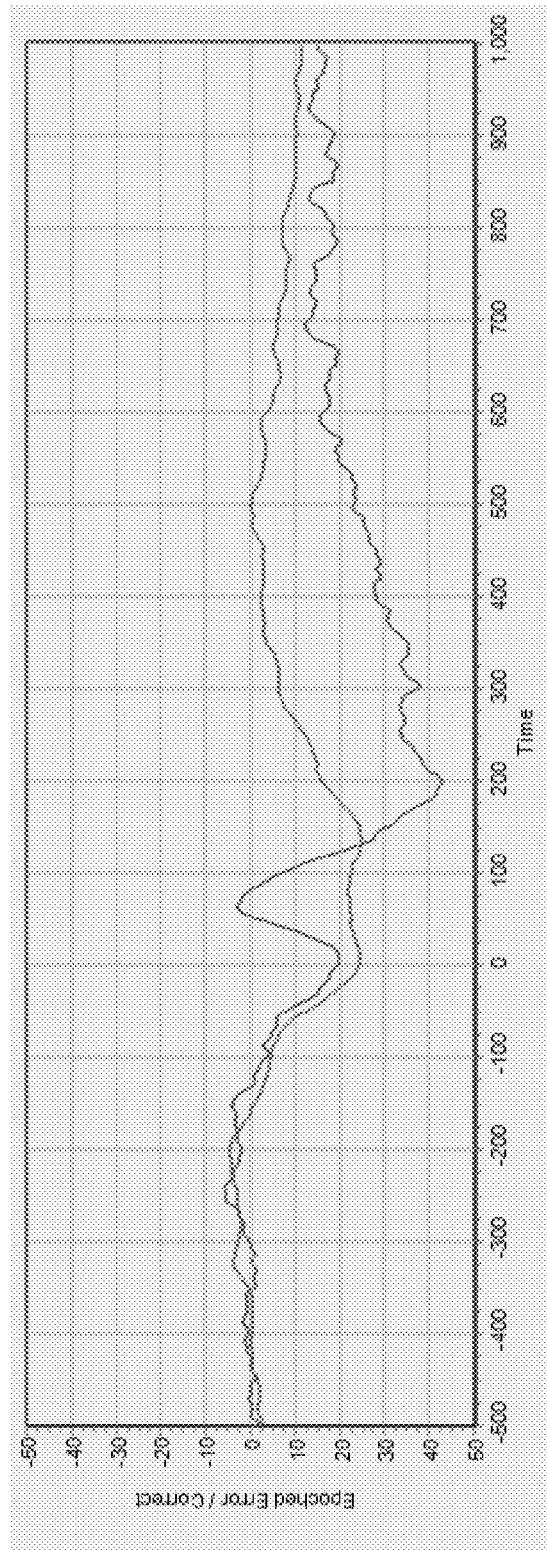
FIG. 5A-D each graphically illustrate ERN changes in an individual with feedback: baseline (left) and post training (right) ERN and CRN for two subjects who underwent neurofeedback, as further described in Example 1, below.
Figure 5B:
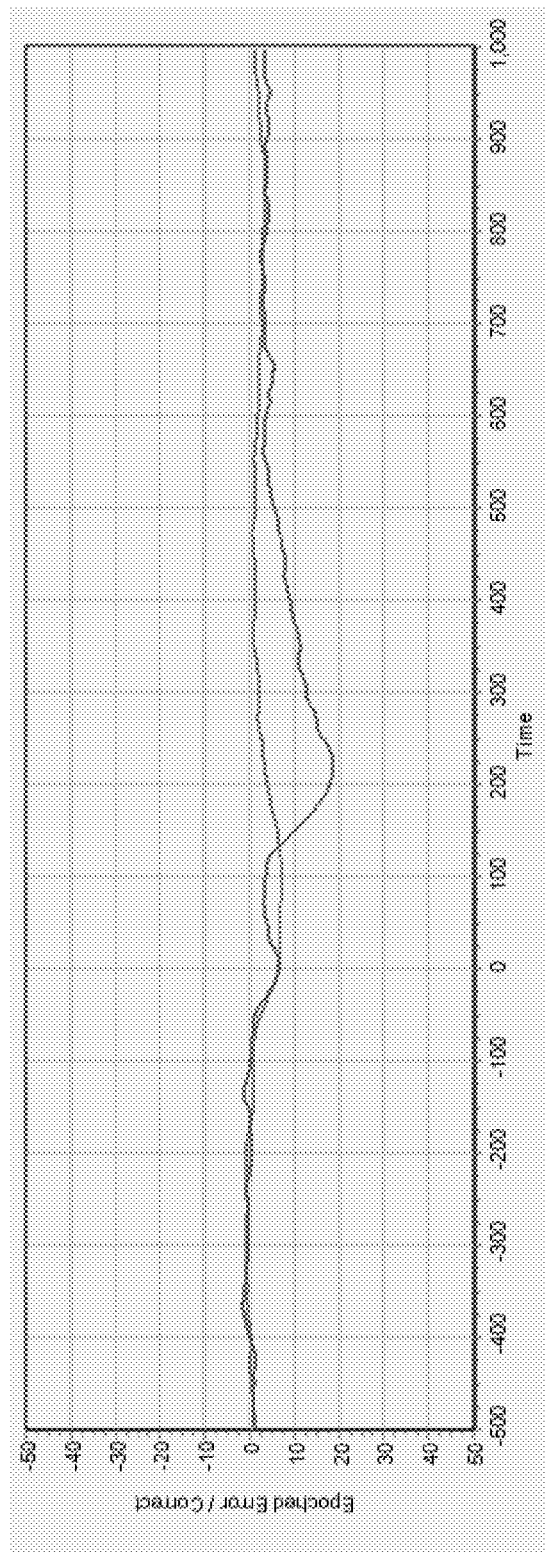
Figure 5C:
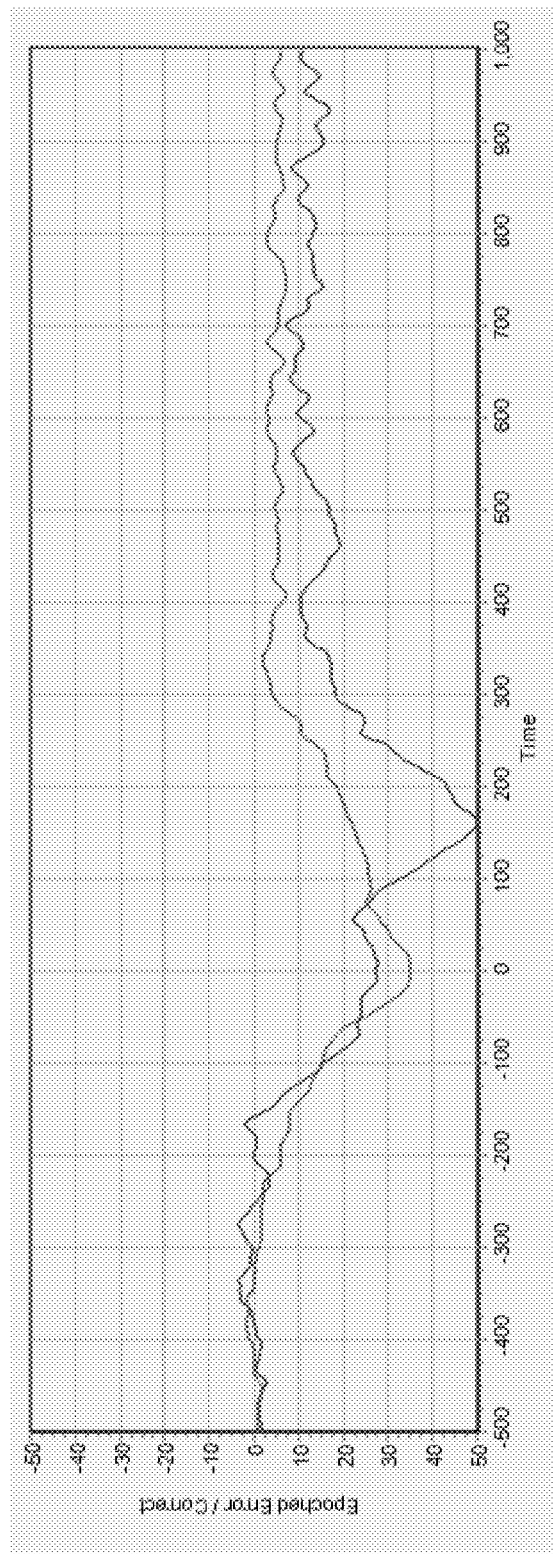
Figure 5D:
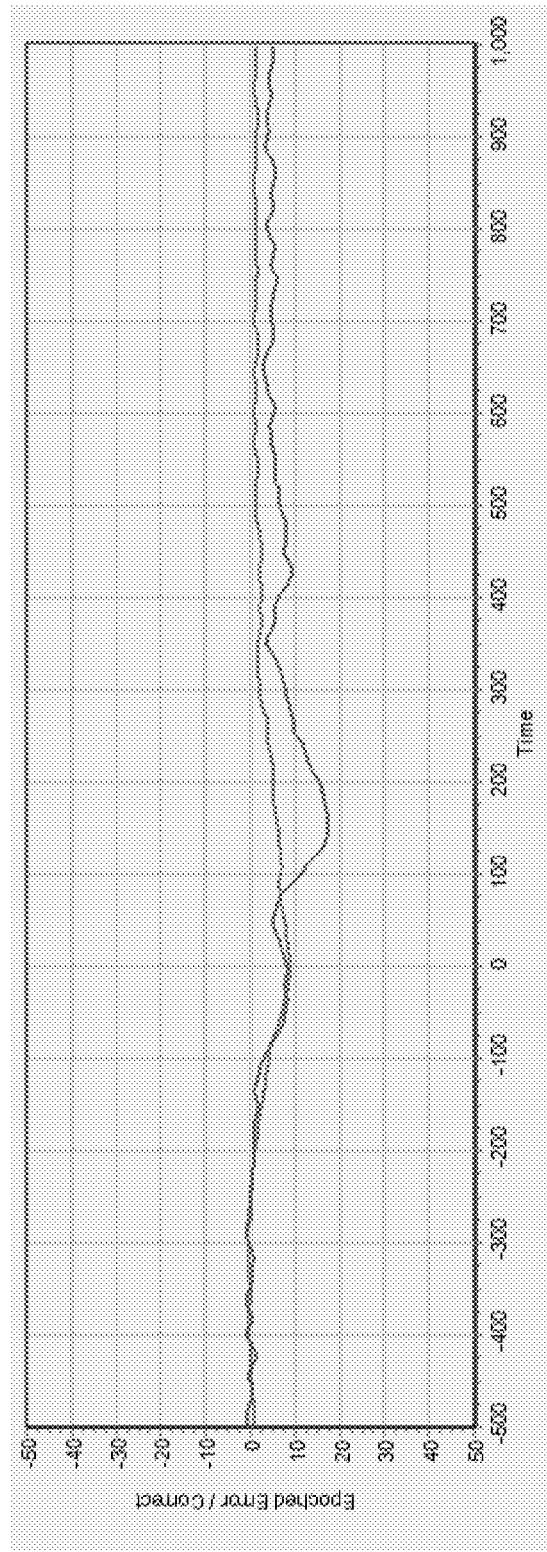

FIG. 4A-B graphically illustrates ERN change with no feedback: a grand average of all 135 participants' ERN and CRNs as calculated via pseudo-online data collection. Data were exported and grand averaged using the first (left) and last (right) 6 incorrect and correct responses. Scale was determined by presets in our data collection suite.

FIG. 5A-D graphically illustrates ERN change with feedback: baseline (left) and post training (right) ERN and CRN for two subjects who underwent neurofeedback. Each participant completed 540 trials of the flanker task. Figures were generating using our online data collection suite.

Discussion

We were able to assess the ERN online and examine its stability and typical change with no feedback. Data provided herein demonstrates that providing feedback can change the ERN using cumulative training.

These results may have clinical implications given the critical role of error monitoring the pathogenesis and etiology of anxiety disorders. The methods of this study can easily be translated for use in other ERPs (for example, late positive potential (LPP) and FN) that have been implicated in other clinical conditions.

Example 2: Exemplary Neurofeedback Systems

This example demonstrates that products of manufacture, including devices, and kits, and methods, can be effective for reducing error-related negativity (ERN) and anxiety.

Examining symptoms common to multiple disorders may be a fruitful avenue for preventing and reducing the effect of anxiety on functioning. One such symptom is worry, characterized by uncontrolled, excessive, and repetitive thinking about current concerns, future concerns, problems, or experiences[1]. Worry is present across the anxiety disorders including: generalized anxiety disorder, panic disorder, social anxiety disorder, simple phobia, and obsessive-compulsive disorder[23] as well as mood[24] and substance use disorders[25]. Thus, efforts to reduce worry has transdiagnostic relevance. However, patients who experience worry and other forms of negative self-referential processing often do not respond to traditional interventions[2]. To date, studies have not targeted worry as a transdiagnostic construct using a brief, computerized intervention. However, there are clear advantages to targeting worry because it presents across several disorders, and because worry is linked to poor outcomes in clinical trials. Thus, worry is intractable and no readily available, easily disassemble, interventions exist for treating worry.

Candidate Biological Mechanism Responsible for Worry

One potential biological mechanism responsible for elevated worry may be an oversensitive action monitoring system (i.e., increased sensitivity to errors). Recent meta-analyses suggest that anxious individuals are characterized by an increased neural response to errors when compared to non-anxious controls, as revealed by larger error-related negativity (ERN[3,4,26]). Mistakes are motivationally salient, perhaps more so for individuals with elevated worry. Indeed, the motivational hypothesis regarding the role of errors and action monitoring in anxiety suggests that errors are an internal and unpredictable signal of threat—and more so for individuals with elevated worry[5,27,28].

The error-related negativity (ERN) is a negative deflection in the event-related potential (ERP) waveform peaking at frontocentral electrode sites approximately coincident with the commission of an error[6,29]. Although some studies combining functional magnetic resonance imaging (fMRI) and ERPs suggest that the ERN is likely generated in the dorsal anterior cingulate cortex (dACC[30,31]), a region that integrates information about conflict and punishment in order to optimize behavior, other studies suggest multiple brain regions contribute to the generation of the ERN[26,32].

There is ample evidence for the relationship between individual differences in anxiety and increased ERN amplitude (for reviews, see[4,7-10,33]). However, the majority of these studies have examined categorical diagnoses of Generalized Anxiety Disorder (GAD[10,34,35]), Social Anxiety Disorder (SAD[36-38]), and obsessive-compulsive disorder (OCD; see[39] for a review). As GAD and OCD are largely characterized by worry[40,41,] Moser and colleagues suggested that ERN is reflective of anxious apprehension (i.e., worry)[4]. Consistent with this hypothesis, Hajcak and colleagues[34] showed that the ERN was enhanced in college students high in anxious apprehension but not in spider phobic students[9,42]. In additional, the ERN can predict anxiety prospectively, indicating that elevated ERN represents a diathesis for anxiety disorders[43,44]. More relevant to the aims of the current proposal, there is a direct relationship between worry and ERN. For example, in a meta-analysis Moser and colleagues[4] demonstrated a robust relationship between anxious apprehension (i.e., worry) and ERN, r=−0.25.

Attempt to Modulate Action Monitoring

Studies have examined whether the ERN can be modified. For example, two studies showed that when participants are punished for their errors, the ERN increases[45,46]. Other work has aimed to reduce the ERN through interventions. For example, Schroder and colleagues[47] found that an expressive writing intervention reduced the ERN among participants high in worry, relative to a control writing condition. Finally, Reinhart and Woodman[48], found that transcranial direct current stimulation (tDSC) reduced the ERN in healthy participants.

In two studies, our group examined the effect of computerized adaptive attention bias modification (ABM) program for reducing the ERN. Nelson, Jackson, Amir, and Hajcak[11] examined the effect of a single session of ABM on the neural correlates of response monitoring, including the ERN. ABM is a computerized task that aims to train attention away from negative stimuli and towards positive stimuli thus targeting a core mechanism of dysfunction in anxiety disorders (i.e., attentional bias toward threat[49]). ABM has been shown to successfully decrease threat biases and anxiety symptoms[50,51]. Thus Nelson and colleagues[11,12] hypothesized that ABM might modulate the ERN, a posited neural index of threat sensitivity[5]. Participants were randomly assigned to complete ABM before or after the ERN was measured (i.e., AB/BA design).

We found that the ERN was smaller in participants who completed ABM before, relative to those who completed ABM after the ERN was measured suggesting that the former group showed a smaller ERN relative to their ABM-naive counterparts. However, that study did not include a control group that completed an analogous cognitive task. Thus, it is unclear if ABM training directly altered the ERN, or if there were other factors (for example, task fatigue) that impacted the ERN. Additionally, the design did not include pre- and post-training assessments of the ERN, thereby prohibiting the examination of within-subject changes in the ERN. To address these issues, Nelson and colleagues[12] examined the impact of ABM on the ERN using a pre-test/post-test design, in participants randomized to either an ABM or a control task. Nelson and colleague found that among participants who completed ABM, the ERN decreased from the pre- to post-training assessment. In contrast, in participants who completed the control task, the ERN did not differ between the pre- and post-training assessment. Thus, a single session of ABM reduced error-related brain activity.

These studies suggest that ABM, which can reduce anxiety, and may reduce the ERN. These data indicate that the ERN can be modified with a brief computerized behavioral intervention. It is important to note, however, that ABM was not designed to target the ERN.

In summary, the above literature suggests that: 1) worry is a potential cognitive marker for the development and maintenance of anxiety disorders, 2) that increased action monitoring (for example, the ERN) may be a biological maker for worry, and 3) that action monitoring is modifiable with error punishment and ABM.

We examined the role of neurofeedback in reducing action monitoring. In the following section we provide data relevant to the effect of neurofeedback on ERPs.

Why Use Neurofeedback (NF) as Compared as to Other Accessible Interventions

NF is a psychophysiological approach that is inherently different than typical psychological interventions, for example, exposure treatments, or ABM—and as such, may reach individuals who do not respond to, or refuse, exposure-based treatments. Moreover, NF can be used to target very specific ERP measures, whereas other treatments (for example cognitive behavioral therapy (CBT), attention bias modification (ABM) or other exposure-based treatments) target multiple mechanisms and the pathways of treatment efficacy are less clear[2]. In fact, the reduction of anxiety through CBT cannot be explained by a physiological marker such as the ERN[52]. That is, CBT does not appear to directly target the ERN. Finally, NF has been used successfully to target neural indices that are related to psychopathology[14].

Biofeedback can be used to target a range of biological processes (for example blood pressure, heart rate, brain frequency). In contrast to biofeedback that uses psychophysiological techniques for monitoring and modifying signals from the peripheral nervous system (for example, heart rate), neurofeedback (NF) aims to monitor and modify signals from the central nervous system with the goal of affecting cognitive and emotional processing. Specifically, participants learn how to control brain activity using real time feedback based on signals from the brain (for example, electro-encephalography (EEG) or functional magnetic resonance imaging (fMRI)). As such, these techniques may prove to be a more efficient and direct manipulation of specific neural targets than alternative interventions[14].

EEG based techniques have the added advantage of cost efficiency as they may be more readily deployed in clinics or even participants' homes using newer mobile technologies. Few studies have attempted to modulate ERPs with NF and none have targeted the ERN. Within the EEG domain, there are at least three broad domains of focus for NF: 1) frequency-based strategies, 2) time-based strategies or event related potentials, and 3) Time-Frequency-based strategies. To the best of our knowledge no studies have attempted to modulate time-based EEG measures of the ERN; and no studies in general have attempted to modulate time-frequency-based domains. In the current proposal we will aim to use time-based EEG, or event related potentials (ERPs). However, we will also explore the possibly of modulating time-frequency domain measures. In the following sections we provide a summary of each literature as well as our rationale for focusing on ERPs.

Frequency-Based Methods of Neurofeedback

Frequency-based neurofeedback (frequency based-NF) involves real-time analysis of EEG signals using Fourier transformation in order to modify the power spectrum of the underlying EEG frequencies. As an example, participants might receive biofeedback to reduce frontal alpha band activity. In general, these frequencies are not tied to specific events, and the functional significance of power-band changes is unclear. Despite a large body of research literature using frequency based-NF, there is limited efficacy on clinical outcomes. More relevant to the aims of the current proposal, although there is ample evidence for the role of various frequency domains (for example theta/beta ratio) in particular cognitive abilities (for example, general attention focus), the link between the various frequencies and different forms of psychopathology is less clear. For example, although there is evidence for aberrant theta/beta ratio in ADHD[53], there is lack of research showing that presence of theta/beta ratio can lead to the development of ADHD. Such data would bolster the argument that modulation of theta/beta ratio would lead to reduction of symptoms of ADHD. In comparison, abnormalities of ERPs have been linked to specific forms of psychopathology and risk for disorders, and can be used to address some of these concerns.

Time-Based Methods of Neurofeedback Using Event Related Protentional (ERPs)

Time-based EEG signal analysis relying on event-related potentials (ERPs) have also been used for Neurofeedback. However, the current proposal would be the first ERP-based NF study targeting action monitoring. ERPs differ from frequency-based methods of EEG analysis insofar as ERPs are elicited by specific event (i.e., either the presentation of a stimulus or the response generated by a participant). For example, Arvaneh and colleagues[54], used NF training using a Brain Computer Interface (BCI) game to target the P300 in order to improve cognitive performance in young healthy adults. The game became more difficult adaptively, requiring the generation of a larger P300 in response to target stimuli in order to advance to higher levels. In the first phase of the study, these authors calibrated each participant's P300 by examining the participant's accuracy in using their P300 signals to spell letters. In the NF phase, they provided participants feedback about their accuracy (tied to their P300) so that they would be able to enhance their P300 and hence their cognitive control. Results showed that the BCI neurofeedback training yielded a significant enhancement in the P300 as well as the P600 components of the EEG to target trials (i.e., 150-550 ms after the onset of stimuli).

In contrast to the P300 training that aims at improving cognitive performance, ERN-NF targeting the ERN may be better suited for enhancing emotional dysregulation that is likely involved in excessive worry. Specifically, ERN NF will require participants to modulate their EEG activity time-locked to error commission. The epoch of interest is the difference between the EEG average amplitude immediately after an error response (for example, 100 ms) in relation to baseline EEG (i.e, defined as the 300-500 ms prior to the response). As reviewed above, the error-related negativity (ERN[3,4,26]) is a negative deflection in the ERP waveform after the commission of an error and there is ample evidence for the relationship between individual differences in anxious apprehension or worry and increased ERN amplitude[4,7-9,42].

The ERN may be an ideal target for a computerized NF-based treatment for worry because it has been previously demonstrated to be modifiable, for example using attention bias modification (ABM[11,12]), it has been found to be internally consistent[7] with as few as 6 error trials. Thus, we target worry via the ERN neurofeedback.

In exemplary methods as provided herein, we use innovations in intervention, methods of delivery, and dosing design firmly grounded in Research Domain Criteria (RDoC) (U.S. National Institute of Mental Health, NIH) in order to address a significant public health need.

Exemplary methods as provided herein are the first ERN-NF program aimed at modulating the ERN and in turn, worry. While there is a history of frequency-based NF over the last twenty years, most of these studies have used theta/beta ratio measures to target cognitive functions peripheral to the disorders they intend to treat. Our approach, ERN-NF, instead targets the action monitoring system (for example, the ERN) a well-established ERP biomarker of anxiety[3-5]. We provide data showing that the action monitoring system can be reliably assessed within a single session (i.e., has high internal consistency. Moreover, we provide data showing that ERN-NF can modulate the action monitoring system within and across sessions, and that a reduction of the ERN leads to reductions in anxiety as worry.

Exemplary methods as provided herein systematically dose the delivery of the ERN-NF in a large group of individuals with moderate to high worry at baseline. We test whether a full course of ERN-NF modifies the ERN (R61) and examine whether neurofeedback-related changes in ERN account for reductions in worry symptoms in patients diagnosed with GAD, OCD, or Social Phobia (R33). Thus, provided herein is a computerized intervention that directly targets a neural measure linked to worry, a vulnerability factor for a host of negative health issues.

We have developed an in-house software (MOMENT™, https://nas.psy.sdsu.edu/moment) to provide ERN-NF that is capable of processing 32 channels of EEG data in real time. MOMENT™ collects, processes, and provides averaged ERPs in real time, compared to the traditional means of processing ERP data, that can take hours to process data following EEG data collection. Consistent with NIMH Strategic Objective to strengthen the public health impact of its research, in addition to using this program for ERN-NF, this program allows researchers and practitioners to investigate the relationships between ERPs and symptoms at the individual level and would allow real-time use of ERPs for clinical purposes.

The method of delivery: In line with the NIMH's Research Priority to "tailor existing and new interventions to optimize outcomes", our approach in the R61 phase optimizes the potency of ERN-NF in order to reduce participant burden. Specifically, we utilize a Parallel Multiple Dose Design to determine which dose maximizes the change in ERN with the lowest burden to participants.

The design is firmly grounded in RDoC: We propose to investigate aspects of the Negative Valence System of the RDoC matrix, namely, the relationship between the ERN, a physiological measure of Sustained Threat, and worry, a self-report measure of Potential Threat, both with large literatures that support their consideration as vulnerability markers of anxiety. Within this framework, our target mechanism is the ERN (R61) and worry is our treatment target (R33). Both ERN and worry are dimensional and transdiagnostic measures. This will be one of the first studies to directly examine the causal relationship between the ERN and worry by attempting to directly modulate the ERN through NF, and examine the subsequent effect on worry. In addition to the link between worry and anxiety, worry is considered a vulnerability marker for a range of negative health consequences, including depression, suicide and substance use disorders[24,25]. The change in ERN after neurofeedback will also reduce worry based on our data (see FIG. 11). Exemplary treatments as provided herein can be used for further transdiagnostic systems and health difficulties.

Approach: We examine the dose-response relationship between ERN-NF and the ERN (R61) and examine the effect of an optimal dose of ERN-NF on worry in patients with GAD, OCD, or Social Phobia (R33). In the following sections we provide data where 150 participants show that the ERN is: 1) internally stable during a single session 2) shows a robust correlation with worry in a separate sample of 106 participants with and without an anxiety disorder diagnosis, and that 3) can be modified using real-time ERN-NF and instruction to increase the values of ERN and that this modification as a reduction of the ERN would lead to reductions in anxiety apprehension and worry.

Studies Using the flanker task to assess ERN: To assess the stability of the ERN we use an arrowhead version of the flanker task[55]. On each trial, participants see five horizontally aligned arrowheads and are instructed to indicate the direction of the central arrowhead (for example, pointing to the left or right). For half of the trials, the center arrowhead points in the same direction as the flanking arrowheads (">>>>>"; congruent trials). In the other half of trials, the center arrowhead points in the opposite direction as the flanking arrowheads ("<< ><<"; incongruent trials). Each trial begins with the fixation cross presented for 400 ms with a jitter of 600 ms (i.e. 400-1000 ms). The fixation cross is then replaced with arrowheads that are presented for 200 ms. The arrowheads are then removed from the screen and replaced with the fixation cross, which remains on the screen until the participants respond. A computer program written in Delphi XE2™[56] controls the presentation and timing of the stimuli on a 24-inch color monitor.

Participants are seated approximately 60 centimeters (cm) away from the computer screen. We instruct participants to use their dominant hand to press the left mouse button if the center arrowhead is pointing to the left and the right mouse button if the center arrowhead was pointing to the right. We also ask them to respond as quickly and accurately as possible. Participants complete a practice block consisting of 64 trials. Following practice, participants completed 5 experimental blocks of 64 trials each, totaling 320 trials. To encourage participants to complete the task as fast as they could but also with high accuracy, we used pop-up windows containing performance feedback after every 30 trials[10]. If a participant's accuracy is below 75%, the message in the pop-up window reads, "Please try to be more accurate." If a participant's accuracy is above 90%, the message in the pop-up window reads, "Please try to respond faster." If a participant's accuracy is between 75% and 90%, the message in the popup window reads, "You are doing a great job!"

To record EEG data we use an EASYCAP™ (EasyCap) electrode cap[57] and the ACTICHAMP™ (ActiCHamp) system[58]. We record EEG from 32 active electrodes (Fp1, Fz, F3, F7, FT9, FCS, FC1, C3, T7, TP9, CP5, CP1, P3, P7, O1, Oz, O2, P4, P8, TP10, CP6, CP2, Cz, C4, T8, FT10, FC6, FC2, F4, F8, and Fp2) using a subset of the International 10-20 system, referenced to Cz and with a ground electrode placed at FPz. The vertical electrooculogram (EOG) is recorded using two electrodes placed above and below the left eye to detect eye blinks. The EEG is filtered using an anti-aliasing low pass filter at 130 Hz and digitized at 500 Hz with 24 bits of resolution. We perform all offline analyses using MOMENT™. We re-reference the EEG data to the average of TP9 and TP10 (located adjacent to the mastoids) and band-pass filter between 0.1 and 30 Hz (non-causal Butterworth impulse response function, half-amplitude cut-off, 12 dB/oct roll-off). The EEG data are segmented for each trial beginning 500 ms prior to the response and continuing for 1000 ms post-response. Next, we baseline correct the data using the time period −500 to −300 ms prior to the response[35]. We manually remove trials that were clearly associated with eye blink activity, as assessed by visual inspection of the waveforms[59] detecting step-like changes of 50.0 uV (400 ms moving window, 10 ms window step[60]).

Additionally, we remove trials with a voltage step more than 50 μV between sample points and trials with a maximum voltage difference of 0.50 μV or less within 100 ms intervals. Trials with response times (RTs) faster than 100 ms and slower than 800 ms are also excluded from analyses.

Studies examining the stability of the ERN from trial to trial in one session: Using the above task and analytical techniques, we found that the ERN is internally consistent. Specifically, we examined the internal consistency of the ERN as a function of increasing number of trials using Cronbach's alpha. In line with previous research[61] we found that in 219 unselected participants the average amplitude of the ERN was internally consistent. In line with Meyer and colleagues[61] we found that with 6 trials the alpha was acceptable and with 10 trials the alpha was good at the Cz electrode (alphas >0.75, FIG. 6).

Figure 6:
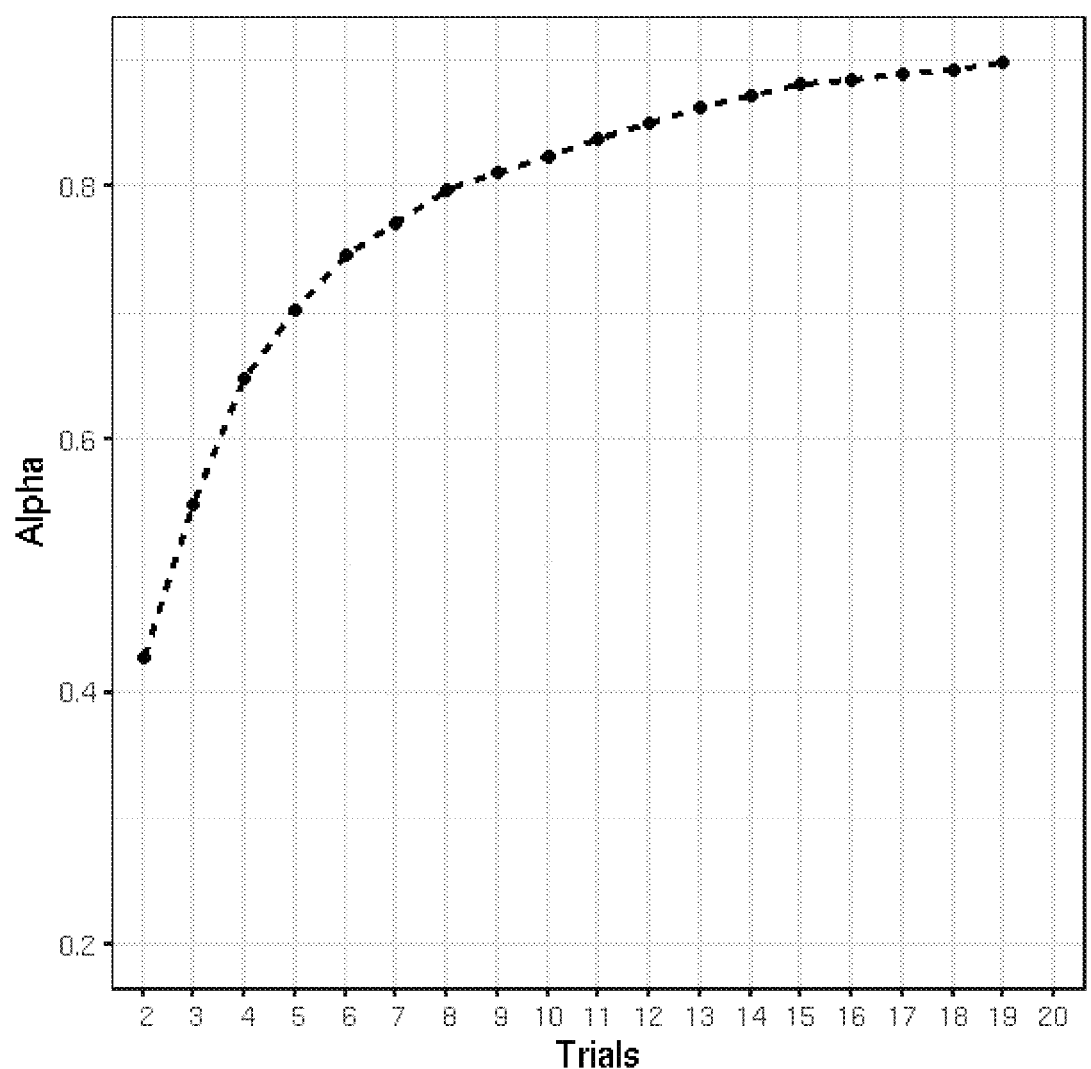
FIG. 6 graphically illustrates ERN (top) and Cronbach's alpha for the ERN at Cz (bottom) as increasing number of trials were examined, as further described in Example 2, below.

FIG. 6 graphically illustrates: ERN (top) and Cronbach's alpha for the ERN at Cz (bottom) as increasing number of trials were examined.

Studies examining the relationship between ERN and worry in high worries. Using the above task, we measured the ERN in a mixed sample of participants with an anxiety disorder diagnosis (i.e., GAD, SP, and OCD) and participant without an anxiety disorder varying in levels of worry. Of the 106 participants, 85% (91) had a minimum score of 30 on the Penn State Worry Questionnaire[15] (PSWQ, moderate to high-worriers), see also below, and 15% had a PSWQ score less than 30 (low-worriers, FIG. 7).

We then progressively limited the sample to higher worries by eliminating those with low worry scores and recalculating the correlation between the ERN and worry. These results showed that the highest correlation between the ERN and worry was achieved in the participants with scores of 30 or higher on PSWQ (FIG. 7) resulting in a significant correlation between the PSWQ scores and ERN of r=−0.21, p=0.04 in that group. In the low worry group this relationship was reversed (r=0.55, p=0.03). Therefore, we used 30 as the cut off score.

Figure 7A:
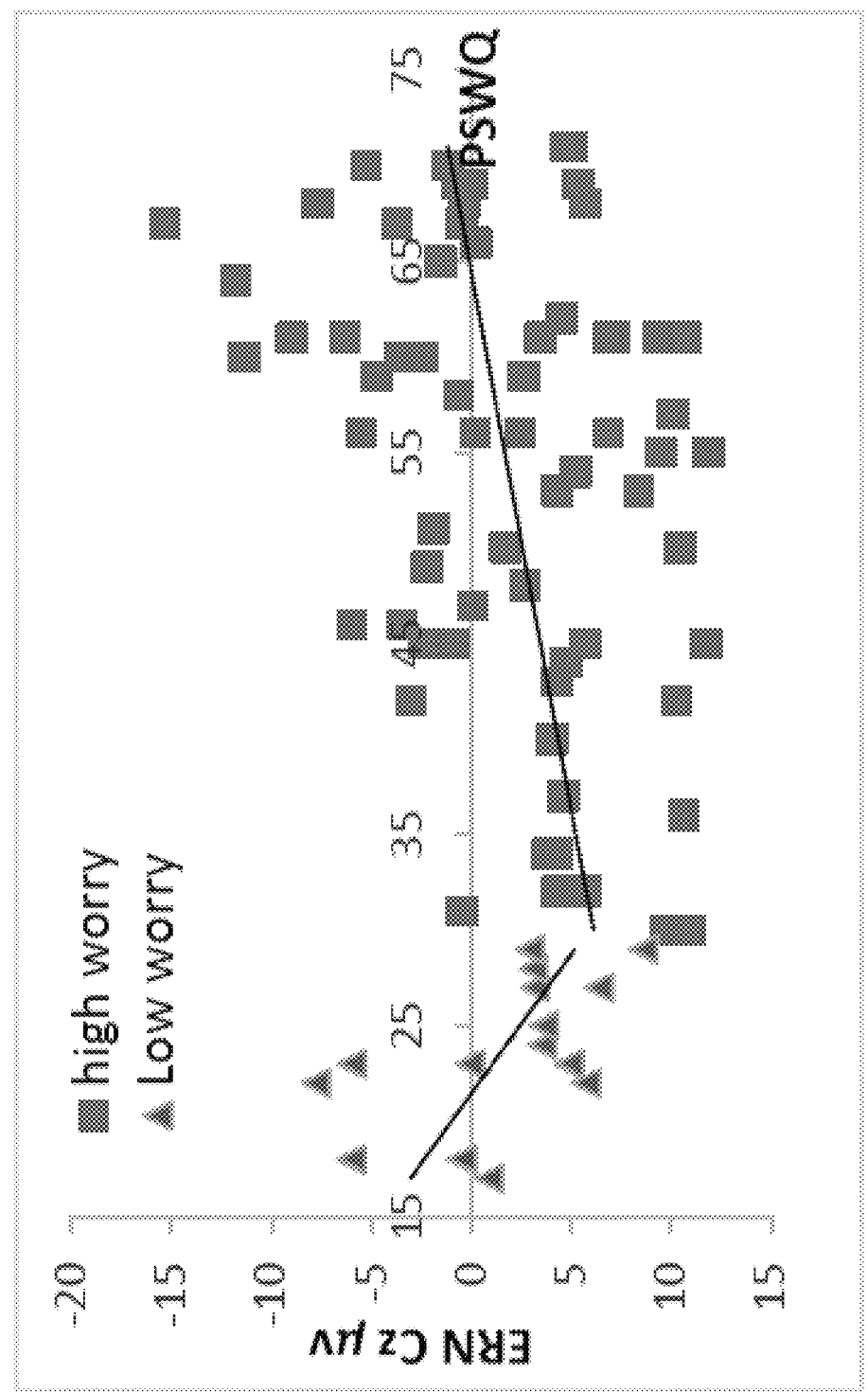
FIG. 7A-B.
Figure 7B:
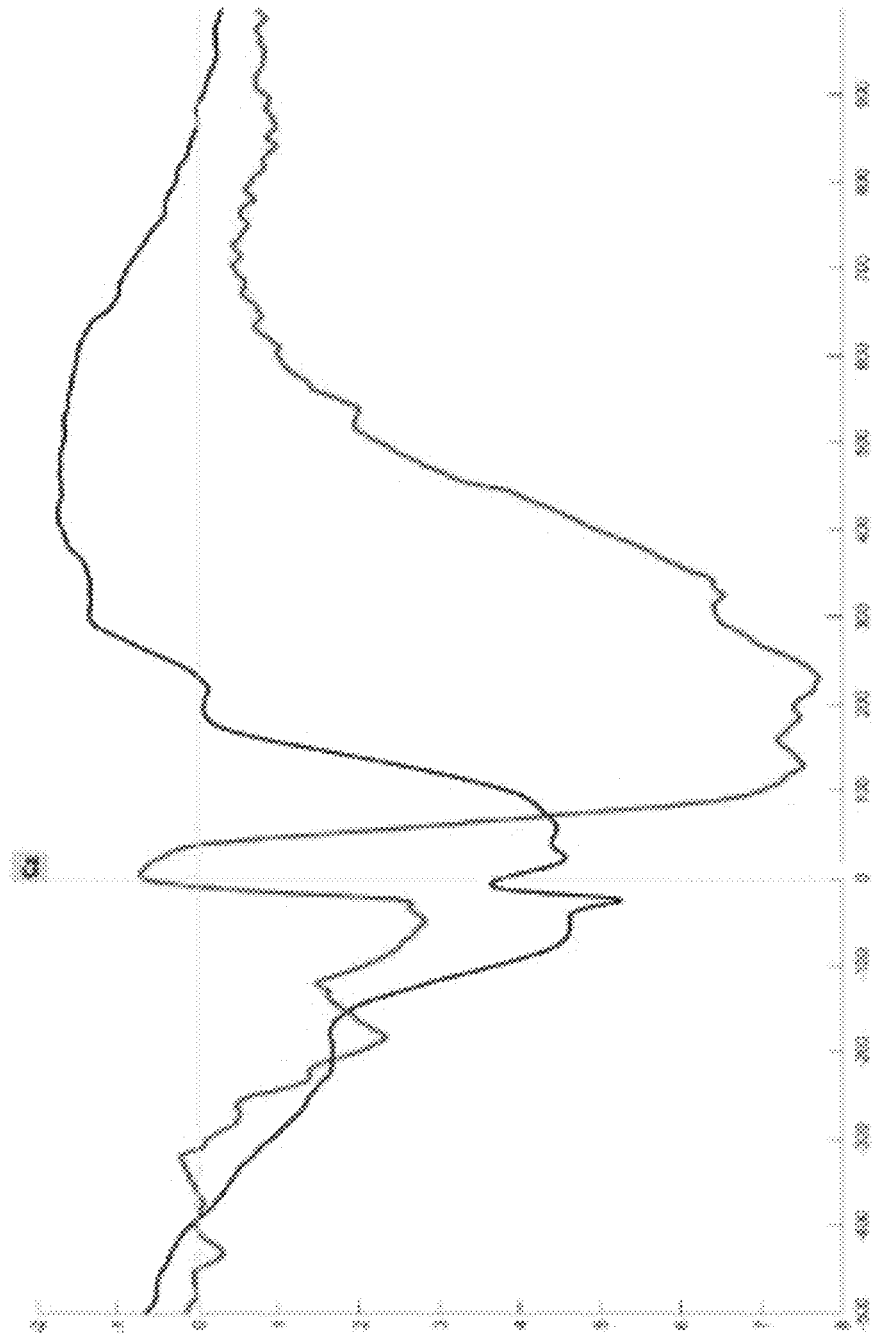

FIG. 7A graphically illustrates the Correlation between ERN and worry (PSWQ) Average ERN in the overall sample in high (red) and Low (green) worries, and FIG. 7B graphically illustrates average ERN in the overall sample.

Studies focused on modulation of action monitoring: The above studies established the stability of our action monitoring indices in a single session. We next attempted to demonstrate that we were able to 1) to collect data and process in real time the necessary information in order to calculate a running average ERP that would be used for ERN-NF, 2) determine the optimum strategy to suggest to participants to change their ERN, 3) change participants' ERPs both within and across sessions.

We used an in-house developed system, MOMENT™, to administer ERN-NF. In brief, MOMENT™ uses the lab streaming layer (LSL, https://github.com/sccn/labstream-inglayer), system for the unified collection and measurement of time series data in research experiments. LSL captures the data from the recording computer and delivers this data to any computer on the network running MOMENT™. MOMENT™ then 1) removes DC-offset, 2) re-references the signals to the average of the mastoid electrodes, 2) band pass filters the data removing frequencies outside the range of 0.01 to 30 Hz, 3) conducts artifact rejection (for example, +/−50 mV moving window and +/−200 simple voltage), 4) epochs the data (−500 ms to 1000 ms) to the windows surround the response, 5) scores the ERN.

To examine the psychometric properties of data collected and analyzed using MOMENT™, we submitted the data generated in real-time to the same tests reported above. The epoched data generated by MOMENT™ showed good internal consistency (great than (>) 0.8) using 6 errors.

Optimum strategy to suggest to participants: A common strategy in frequency-based NF training is to instruct participants to be relaxed and attentive. However, no systematic data is available examining the utility of this approach. Roberts and colleagues[62] examined the role of different strategies in neurofeedback during a Go/No Go experiment. They found that strategies differed from subject to subject and within the same subject in the course of the experiment. These researchers concluded that strategies are individually developed and as a consequence they recommended not to suggest strategies to subjects. Similarly, Kober and colleagues[63] found that subjects who reported no specific strategy improved most in neurofeedback[64]. Thus, vivid strategies might overload cognitive resources, not focusing on any one strategy may indicate a more automatic regulation of EEG[65]. Thus, we used the instructions in Table 1:

TABLE 1

Instruction for neurofeedback to participants

1) People vary in their reactivity to mistakes. Mistakes can be informative about future behavior and sensitivity to mistakes is evolutionary adaptive. However, some people seem to be oversensitive to small mistakes and that this over-sensitivity may cause anxiety.
2) Moment was designed to help assess your brain's sensitivity to mistakes and give you feedback in order to reduce any oversensitivity.
3) Your goal is to try use this information to reduce your sensitivity to mistakes using various strategies that people sometime use.
4) You can adopt a frame of mind such that making errors isn't so bad; generally taking it easy on yourself. You may also find it useful to use different strategies at different times.
5) The program will give you feedback about your level of sensitivity in terms of levels. Every time your sensitivity is reduced you move up in levels in the program.
6) Your goal is simply to use any strategy that helps to move up in levels.

Single session neurofeedback to decrease sensitivity to mistakes: We asked 25 participants with elevated anxiety (as measured by the STAI) to complete a session of Moment comprising 3 blocks, of 180 trials each. In the first session, after the initial block (baseline), we provided participants with feedback regarding their ERN amplitude using a level analogy. To provide feedback, we first introduced the concept of ERN (see Table 1), explained the relationship between ERN and anxiety and that the program was designed to help reduce their ERN. We then asked participants to complete 2 blocks of the flanker task, each comprising 180 trials, while receiving ERN-NF. In the following sessions 2 and 3, participants received ERN-NF for each of the 3 blocks per session.

Figure 8:
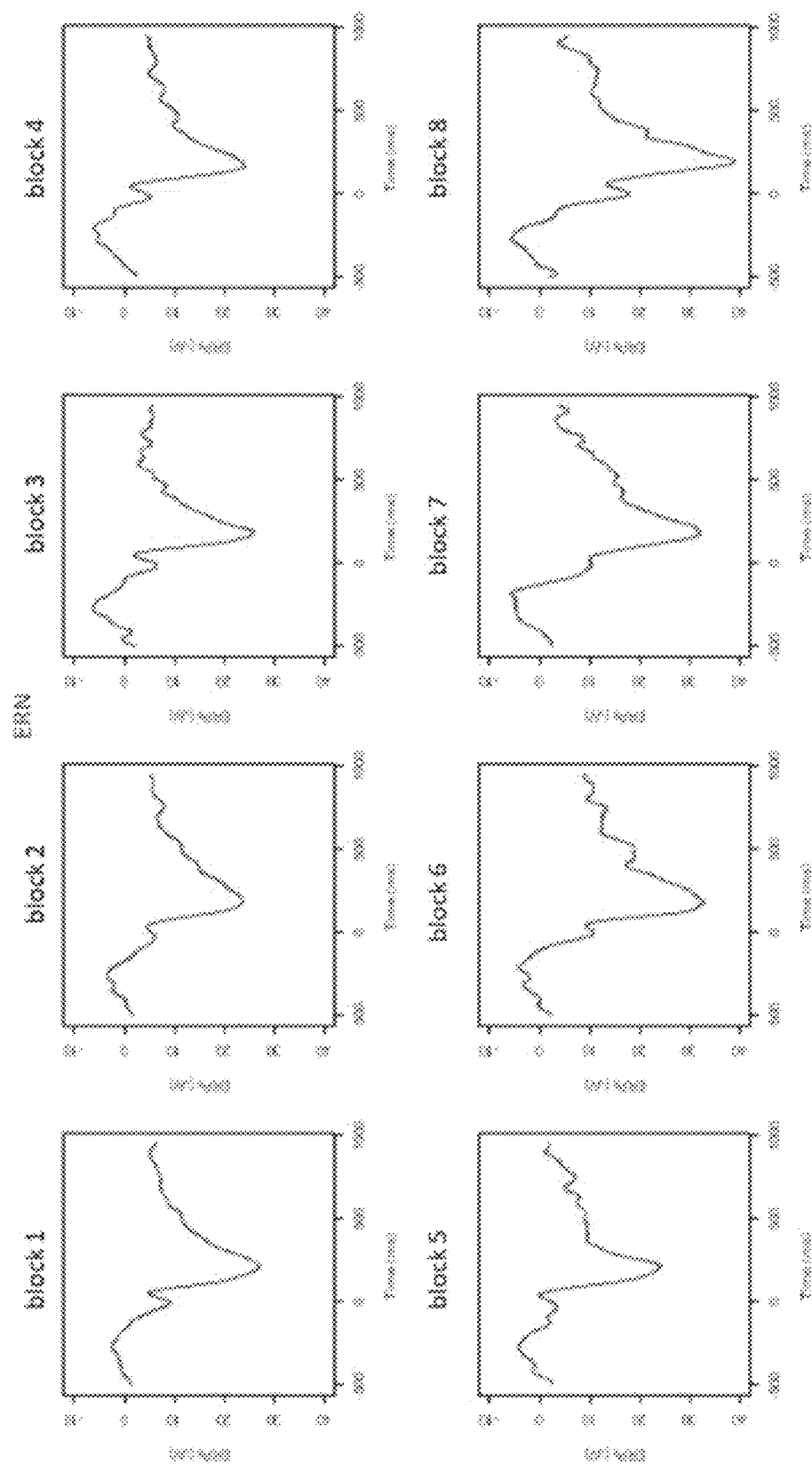
FIG. 8 graphically illustrates the change in the ERN across error trials over blocks, where ERP (μV) is a function of time in milliseconds (ms); as further described in Example 2, below.
Figure 9:
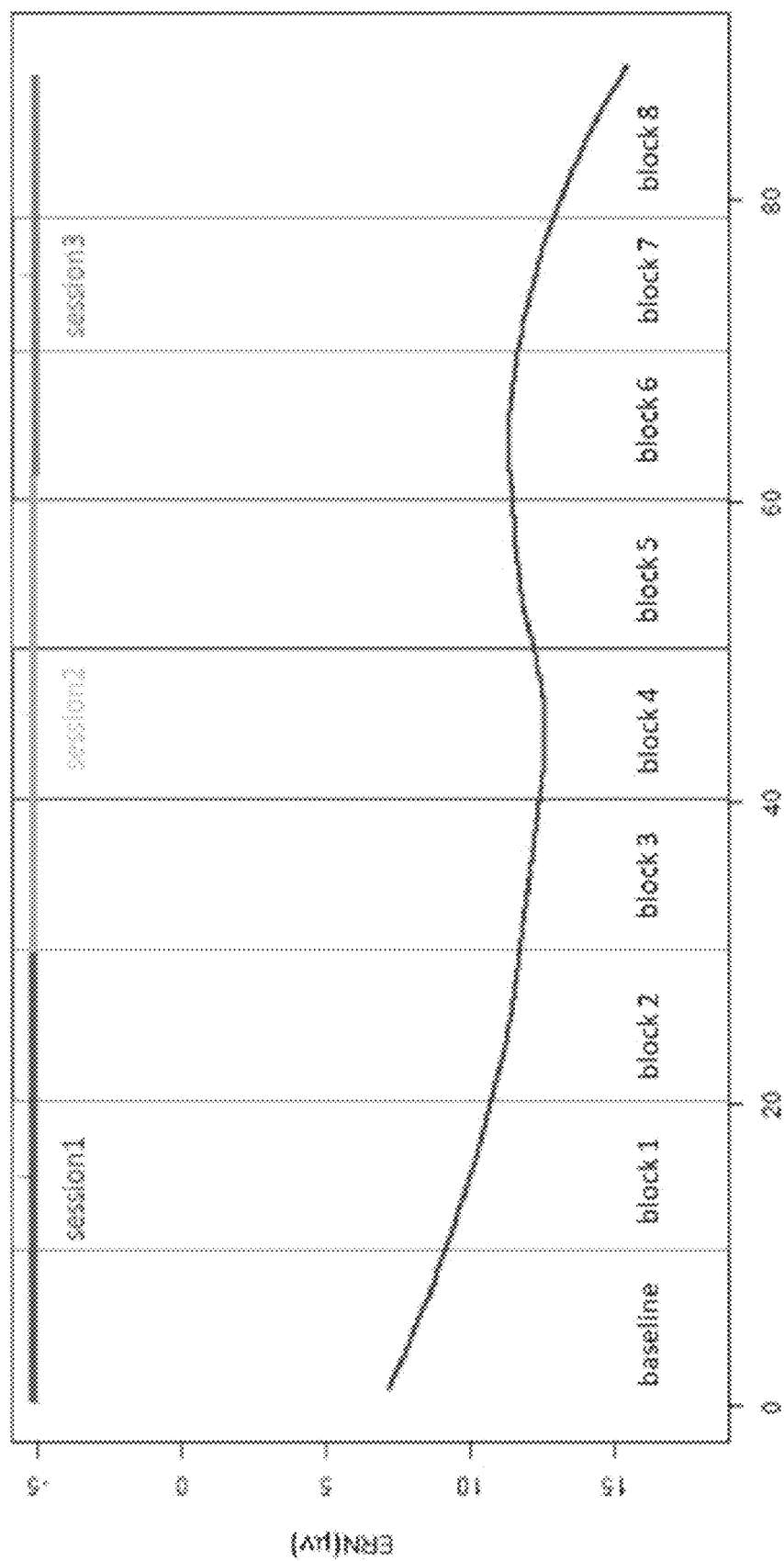
FIG. 9 graphically illustrates the change in the ERN across error trials over blocks in three sessions, where ERP (μV) is a function of time in milliseconds (ms); as further described in Example 2, below.

The flanker task provided feedback after every 30 trials in order to encourage participants to complete the task as fast as they could but also with high accuracy. During the ERN-NF phase we also informed subject about their level in the game with higher levels associated with a larger change in their ERN. Thus, participants received feedback every 30 trials totaling 6 feedbacks about level during the 180 trials of training k. FIG. 8 and FIG. 9 show the evolution across blocks and sessions of the ERN typical waveforms after training in MOMENT™.

Cross session neurofeedback to decrease sensitivity to mistakes: We asked participants to complete 3 sessions of ERN-NF separated by 1 day (for example, on Monday, Wednesday, and Friday of a week). Each session comprised 3 blocks of 180 trials each. At the end of each block we loaded the participants levels from the end of the previous block and asked them to improve upon their previous ERN level. Next we calculated an 11-error moving average for each participant across their training trials. These data are depicted on FIG. 8 and FIG. 9. As it is evident from these figures, the ERN amplitudes continued to decrease across blocks and sessions.

Correlation between neurofeedback induced reduction in the ERN and reductions in anxiety: We correlated the change in the ERN across the 3 training sessions with change in anxiety scores in participants who completed all 9 blocks (N=12). This analysis showed that larger increase in the ERN was correlated with a larger decrease in anxiety (r=0.5, see FIG. 10).

Figure 10:
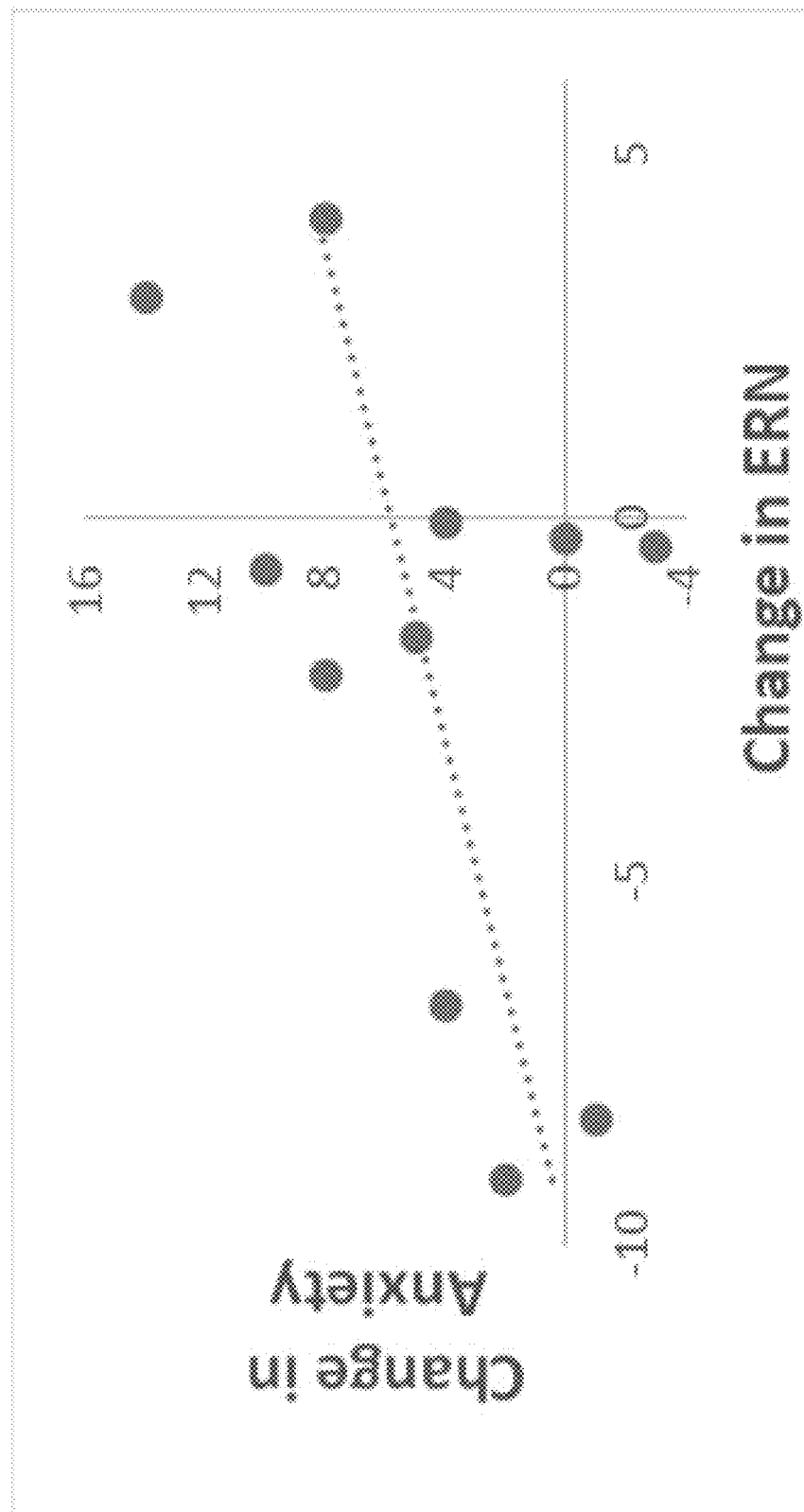
FIG. 10 graphically illustrates the correlation between change in anxiety and change in ERN before and after NF, where change in anxiety is a function of change in ERN; as further described in Example 2, below.

FIG. 10 graphically illustrates the correlation between change in anxiety and change in ERN before and after NF.

In summary, these studies show that ERP measures of action monitoring 1) are stable during a single session; and, 2) can be modulated with neurofeedback.

Determining the most effective dose of ERN-NF. Samples can comprise individuals high in worry (PSWQ≥30). Participants are randomized to two groups: active ERN-NF and a control condition (Yoked Control; YC). Those in the YC receive feedback from another subject prerecorded ERN (unrelated to their ERN) streamed over the lab streaming layer. "go/no-go" criterion comprise larger change in ERN in the active group when compared to the YC with effect size as large as existing interventions targeting ERN (d= 0.31)[12,66] In addition, acceptability of the intervention is assessed. Based on the work of Beard and colleagues[67], we defined acceptability completion of more than 65% of the sessions. Similarly, we define unacceptable drop our rates as dropout higher than 25%.

Penn State Worry Questionnaire (PSWQ[15]) is a self-report measure of worry symptoms. The PSWQ has 16 items, each rated on a five-point scale ('not at all typical of me' to 'very typical of me'). Five items are reverse scored to reduce effects of acquiescence. These reverse scored items are reversed and added to the sum of the rest of the items to create a PSWQ total score. The scores range from 16-80. The PSWQ has high internal consistency[15,23] and test retest reliability[15]. The total score differentiate between people with and without anxiety disorders[23]. There is metric invariance across sex[68], indicating that the measure can be meaningful compared across groups[69].

TABLE 2

PSWQ inclusion and exclusion criteria:

| | Rationale |
|---|---|
| Inclusion Criteria | |
| PSWQ score ≥ 30 | Moderate to Severe worry symptoms; clear need for treatment |
| Age 18-65 inclusive | Age distribution of interest |
| Exclusion Criteria | |
| Bipolar illness, pervasive developmental disorder, mental retardation, dementia, neurological disease that impairs cognition, significant head injuries with loss of consciousness, thought disorder, attention-deficit disorder | Symptoms and/or their treatment would interfere with patient's ability to engage in study treatment |
| Concurrent psychotherapy | Confound study treatment effects |
| Current threat of harm to self or others | Requires immediate intervention |

State Trait Anxiety Inventory (STAI[70]) is a self-report measure of anxiety symptoms. Both the state and trait anxiety forms will be administered. According to Spielberger and Vagg[71], both forms possess adequate psychometric characteristics.

Beck Depression Inventory II (BDI-II[72]) is a self-report measure of symptoms of depression. The BDI-II is a reliable and well-validated measure of depressive symptoms.

Feasibility of Intervention Measure (FIM) and Acceptability of Intervention Measure (AIM) questionnaires to determine level of acceptance of the intervention for participants[73]. The following ERP assessment is administered at the beginning of each neurofeedback session:

Astronauts and Aliens task (AAT). This task assesses the generalizability of the change in the ERN to a different task than the one we will be using for ERN-NF training (i.e. Flanker). In the AAT, an alien or an astronaut is presented on each trial. Participants are instructed to "blast" the alien by pressing the right mouse button, which occurs on 80% of the trials. Additionally, participants are instructed to "not shoot astronauts", by pressing the left mouse button to pictures of the astronaut which occurs on 20% of the trials. Trials in which participants mistakenly click are used to calculate the ERN. There is a high correlation between the ERN (r=0.8[74]) obtained from the flanker task and the AAT, indicating convergent validity. Thus, the AAT task can be used to assess ERN changes in an independent measure of action monitoring.

Figure 11:
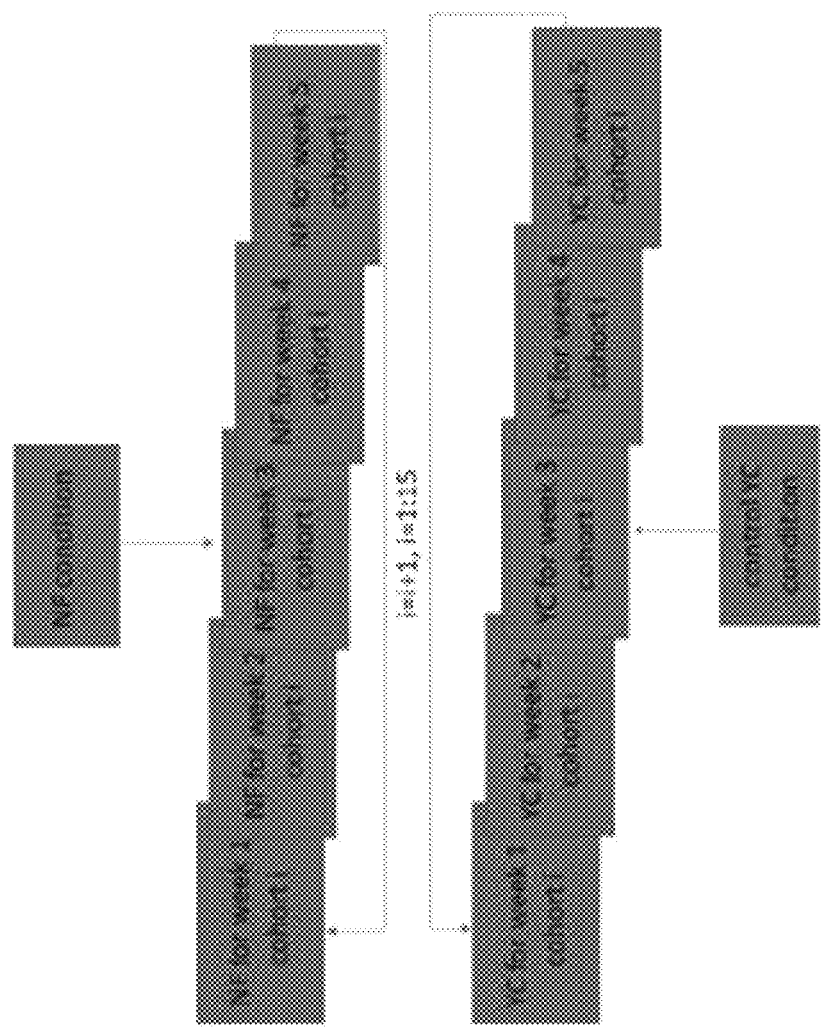
FIG. 11 schematically illustrates an exemplary Parallel Single Dose Design (PSDD) used to establish a minimum dosage of ERN-NF to engage ERN; as further described in Example 2, below.

Procedures and Design to Establish Minimum Dosage of ERN-NF to engage ERN: The participant is informed that this is an experimental procedure to determine the efficacy of a neurofeedback program. The training sessions and the assessments associated with them can take 2 hours. Participants spend approximately 30 minutes completing assessments and the rest of the time for training. The goal is to engage the target mechanism (go/no-go criteria), establish dose, and determine acceptability levels. A Parallel Single Dose Design (PSDD[16,17]) can be used as illustrated in FIG. 11 to address these issues. The PSDD is a simple dose determination administration used in pharmacological studies if there are no serious side effects or practical considerations (i.e. number of participants that can be seen in the clinic during a week). As practical limitations often exist, then the best choice is the multiple administrations of the same dose design also called the parallel multiple dose design (PMDD) which is the most frequently used procedure in typical dose-finding studies[16,17].

In this exemplary design participants are allocated to cohorts of size ten. The allocation ratio is such that there will be 2 participants in the Yoked Control Condition, and 8 in the active Neurofeedback Condition. A combination of the PSDD and PMDD is used: All participants receive the same dose. Cohorts are then cumulatively recruited such that a target sample is reached based on power calculation considering factors such as drop out. As such, it is important to consider negative side effects in these designs including participant negative feedback as well as time and effort burden as well as drop out. The PSDD can comprise 160 participants from our recruited sample to be assigned to the same dose (128 participants to 5 weeks of once per week active ERN-NF and 32 participants to 5-weeks of once per week control YC). The PMDD is optimal for this study because it allows a large number of participants to be recruited in the 2-year award period with the available resources (for example EEG systems, clinicians). This procedure can result in sample of 160 participants with a retention rate of 85% that will provide the sample of 140 participants needed for the study.

Figure 12:
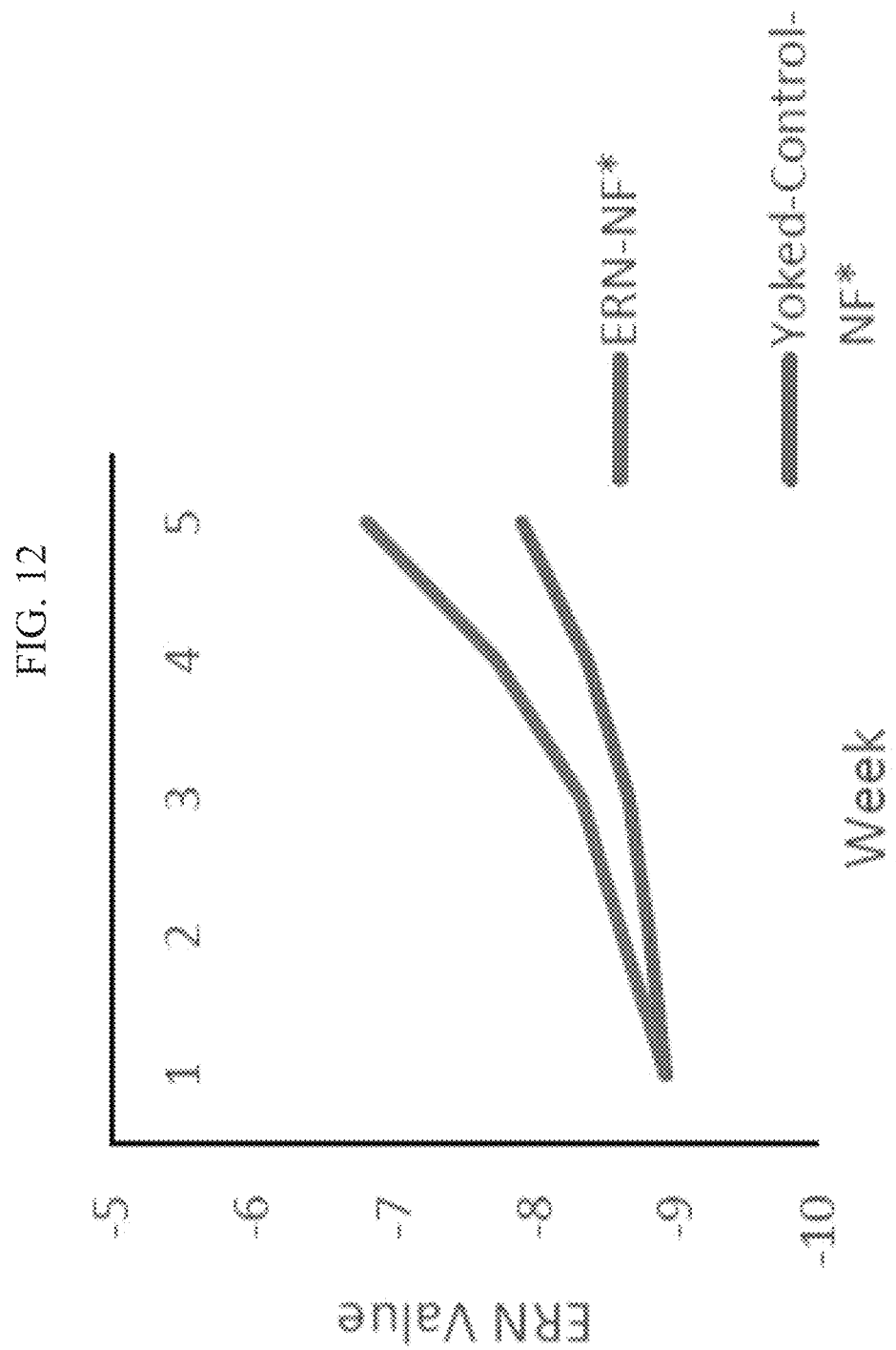
FIG. 12 graphically illustrates changes in ERN between the ERN-NF and yoked-control-NF (YC group); as further described in Example 2, below.

The sample can be divided into 16 cohorts of 10 participants (N=160) with each cohort engaging with their assigned intervention for 5-weeks (80 weeks available during the R61 phase), see FIG. 11. To ensure that the control condition is equally represented across cohorts, each cohort can comprise 8 participants randomized to active ERN-NF and 2 participants randomized to assessment YC. During weekly assessments, we measure changes in ERN in response to each week of ERN-NF until the 5-weeks have concluded for each cohort, acceptability of the intervention, as well as dropout rates. For each cohort, the number of responders per week is defined as participants who show change in ERN defined as significant difference between the ERN-NF and yoked-control-NF (YC group) with an effect size of d=0.31 or larger (see FIG. 12). The final dosage decision can be based on the minimum number of ERN-NF sessions needed to achieve a significant difference from the yoked control condition with effect size of d=0.31 or larger.

Analyses can comprise two parts: 1) confirming that the ERN-NF is successful in changing the ERN and 2) determining the dose at each week within the ERN-NF group, by comparing them to the Yoked controls (YC). Dosing is determined by calculating the difference between the two groups at each week in order to determine the optimal dose (number of weeks needed to obtain the group difference) to administer for the R33 phase. First, to examine reduction in the ERN amplitude from ERN-NF, we hypothesize a basic learning curve as a model represented by a sigmoid function:

$$f(x) = \frac{1}{1+e^x} 75.$$

Figure 13:
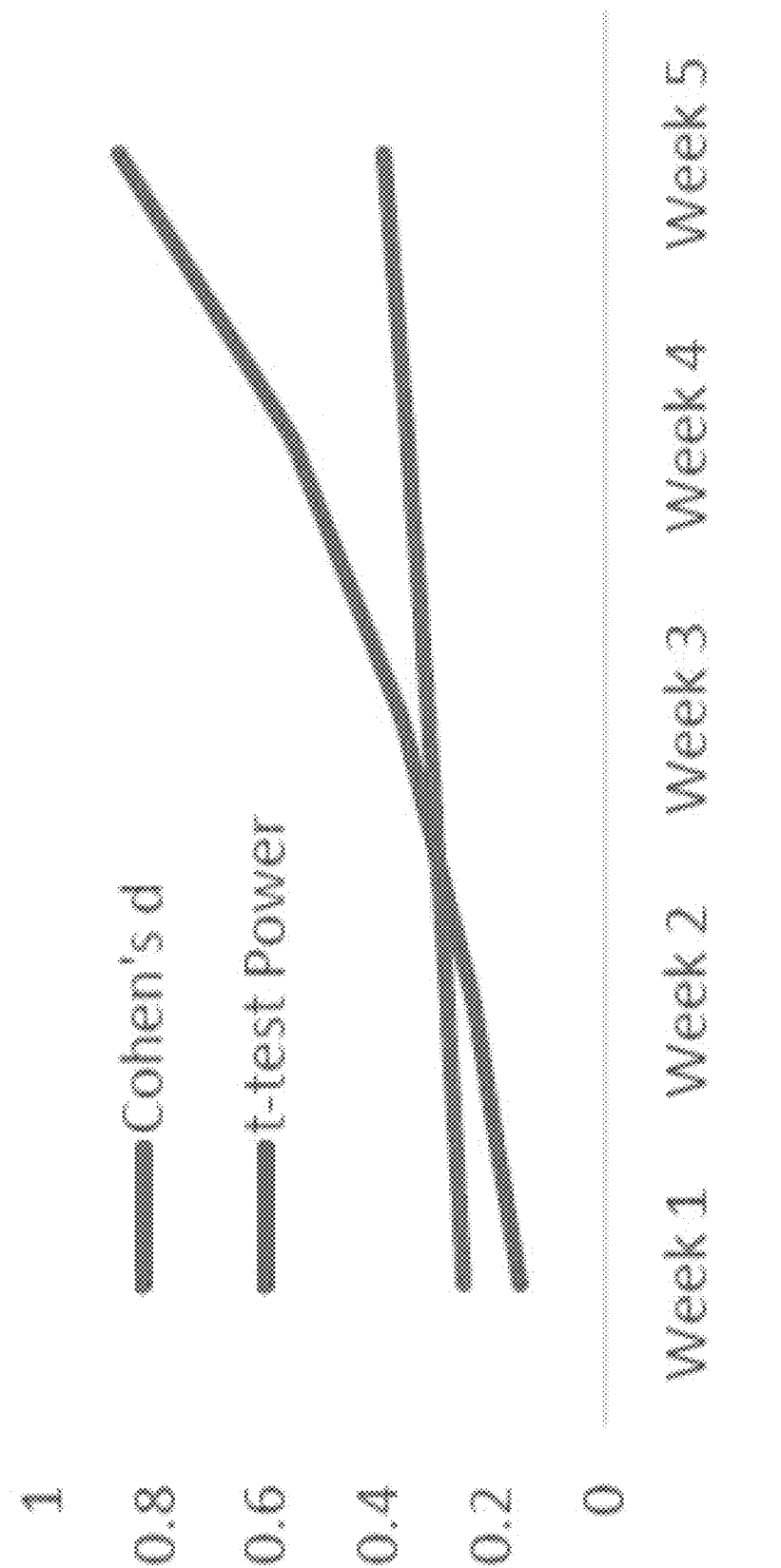
FIG. 13 graphically illustrates the increase in t-test power with each additional week as described in Example 2, below.

In brief, the effect of the first week of treatment can have an effect size of d=0.31 over the yoked control condition (using baseline pilot data; See section A4). We then estimate the ERN at each subsequent week based on the sigmoid function, as depicted in FIG. 13. To examine the effect of treatment at each week, consecutive paired sample t-tests can be conducted between the ERN at baseline (i.e. before any intervention) and at the endings of each week of treatment (weeks 2-5) for all participants in both groups. These one tailed t-tests will determine if there is a significant reduction in the ERN matching the sigmoid learning curve. Second, to determine the optimal dose, after we determine the magnitude of the decrease in ERN at each week, the participants in the active and control conditions are compared to examine the significance and magnitude of the group difference at each week. This number of weeks can be used to determine the optimal dose to administer in the R33 phase.

To determine that we are adequately powered for the proposed analyses, we considered the effect sizes for each week based on above assumptions. The effect sizes of the t-tests between the groups at subsequent weeks in the ERN-NF group is estimated from the group difference discussed in Hajcak, et al.,[76].

We again used the sigmoid curve to estimate the effect size at all subsequent weeks, see FIG. 13. To determine the necessary sample size for a t test at each week, we estimated the effect of group (ERN-NF over YC) based on two recent studies investigating the effects of an attention bias modification paradigm on the ERN in a single session and averaged that effect with the effect of our pilot NF data (Nelson et al.[11,12]; d=0.31). We assume a more conservative medium effect to be Cohen's d=0.25 at week 2 and for the effect of ERN-NF over YC to follow the sigmoid function as well (see FIG. 13). With 140 participants, we can have 78% power to detect an effect at week 2. FIG. 13 depicts the increase in t-test power with each additional week. In summary, with 140 participants, we can be adequately powered to detect effects of time and of responder status at each week.

In summary, our go-no-go criteria we will be that participants in the ERN-NF outperform those in the YC groups with an effect size of d=0.31 or larger. Our dose will be the week during which this criterion is met. In line with the NIMH's Research Priority to "tailor existing and new interventions to optimize outcomes", our approach optimizes the potency of the ERN-NF in order to reduce participant burden. Thus, we also take into account acceptability and feasibility. Specifically, based on prior CBM acceptability and feasibility studies (for example, Beard[67]) we use the following criteria: in brief, Beard and colleagues defined acceptable rates of completion as more than 65% of the sessions of the treatment completed. Similarly, they defined unacceptable drop our rates as dropout higher than 25%. We adopt the same strategy.

A Randomized Controlled Trial (RCT) can be used to examine the link between target engagement of ERN-NF and symptom outcome in individuals who are diagnosed with GAD, OCD, or Social Phobia. We can use the best performance dose determined meeting above go-no-go criteria.

The sample can comprise 180 participants meeting the following criteria: (a) a minimum score of 30 on the PSWQ. All 180 individuals can meet the inclusion and exclusion criteria in Table 2. In addition, participants can meet the inclusion criteria of diagnosis of GAD, OCD, or Social Phobia. The protocol is explained to the participants by the clinician administering the interview and is described as an experimental procedure to determine the efficacy of ERN-NF. The training sessions and the assessments associated with can take about one hour per week. Participants can spend approximately 2 hours completing the assessments during the pre-treatment, post treatment, and follow-up.

Participants can complete the same measures as those including the Go/No Go task. In addition to the above scales and measures, the following measures are administered before and after the ERN-NF protocol. Thus, the inclusion and exclusion will be the same with the exception that in the one phase participant will meet the inclusion criteria of diagnosis of GAD, OCD, or Social Phobia.

To better characterize the population and examine possible connection to disease state the following information is collected: The structured interviews will be packaged together to form one comprehensive interview in the following order: SCID, SDS, HRSA, HAM-D, and CGI, (see details below) and are administered at pre-assessment, post-assessment, and follow-up:

1. The Structured Clinical Interview for DSM-5 (SCID-5-CT[77]) will be used to make diagnoses according to DSM-5 criteria. The SCID will be employed at pre and post treatment to assess for anxiety and comorbid disorders.
2. The Sheehan Disability Scale (SDS[78]) is a three-item instrument for assessing impairment. The SDS will be used to assess impairment due to anxiety symptoms.
3. The Hamilton Rating Scale for Anxiety (HAM-A[79]) consists of 14-items designed to quantify the severity of anxiety symptoms based on the presence of symptoms on each item (anxious mood, tension, fears, insomnia, intellectual impairment, depressed mood, somatic muscular complaints, somatic sensory complaints, cardiovascular symptoms, respiratory symptoms, gastrointestinal symptoms, genitourinary symptoms, autonomic symptoms, patient's behavior at interview). Each item is scored from 0 (not present) to 4. This scale has been shown to have good reliability and validity[80].
4. The Hamilton Rating Scale for Depression (HAM-D[81]) is the most widely used clinician rating scale for assessing severity of depressive symptoms[82]. We will use the 17-item version. The psychometric properties of the scale are supported by an extensive literature[83].
5. Clinician's Global Impression (CGI[84]). Global severity of illness will be assessed using the NIMH CGI, a clinician rated assessment of global illness. Test-retest reliability is sound. Validity of the CGI is demonstrated by strong correlations with clinician rated anxiety and depression symptoms. These correlations remain consistent throughout treatment, suggesting that the CGI scores are sensitive to change over time.

Statistical Analysis Plan and Power: 2 (Group: ERN-NF vs YC)×2 (Time: pre vs. post) analyses of variance (ANOVAs) are conducted on PSWQ. If the Group×Time interaction is significant, the ANOVA is followed up with paired-samples t tests in each group to examine the primary hypotheses concerning neurofeedback training, i.e., individuals randomly assigned to the active ERN-NF condition will show a greater reduction in worry symptoms compared to individuals in YC. To test whether the relationship between ERN-NF and worry symptoms are mediated through change in ERN, we will use a nonparametric bootstrapping method. This method is statistically more powerful than other tests of mediation. To this end, the R package boot is used, which provides a bootstrap estimate of the indirect effect between the independent variable and dependent variable, an estimated standard error, and 95% confidence intervals (CI) for the population value of the indirect effect. CIs for the indirect effect that do not include zero indicate a significant indirect effect at the $p<0.05$ level.

To compute the necessary sample size (N=155) assuming dropout rates of 85% 180 participants are recruited. To determine this number we computed a Monte Carlo power analysis for indirect effects with 1000 replications, 20,000 Monte Carlo draws per replication, a random seed of 1234, and 95% confidence[85]. We estimated that the relationship between ERN-NF and ERN (a path) would be 0.22 (using the average effect size used in the power analysis from the R61 phase, $^2=0.05$;[7,11,12] the relationship between the ERN and worry (b path) would be $-0.35^4$, and the relationship between ERN-NF and worry (c path) would be 0.26 (calculated from Grol et al.[86], investigation of the effect of CBM on worry, $\eta^2=0.18$). Based on the above parameters, we will have 82% power (lower limit=77%, upper limit=83%) to detect a mediated effect of ERN-NF on worry through a change in ERN with 155 participants.

A number of embodiments of the invention have been described. Nevertheless, it can be understood that various modifications may be made without departing from the spirit and scope of the invention. Accordingly, other embodiments are within the scope of the following claims.

What is claimed is:
1. A product of manufacture, device or system for reducing error-related negativity (ERN), worry and/or anxiety, comprising a neurofeedback mechanism system,
   wherein the neurofeedback mechanism system is used on an individual in need thereof to reduce error-related negativity (ERN), worry and/or anxiety, and/or treating or ameliorating an anxiety disorder or obsessive-compulsive disorder (OCD), and/or treating or ameliorating the anxiety or worry in an individual in need thereof,
   wherein the neurofeedback mechanism system comprises:
   (a) an electro-encephalography (EEG) apparatus configured to be operatively linked to a computer and to the individual,
      wherein the EEG apparatus is configured to measure a physiologic response by the individual to stimuli transmitted by the computer, and the EEG apparatus transmits EEG data encompassing the physiologic response by the individual back to the computer,
      wherein the computer is configured to give the stimuli to the individual, and if the individual has a physiologic response to the stimuli the physiologic response is read by the EEG apparatus and physiologic response data is measured, and this physiologic response data is transmitted to the computer, which then provides feedback data based on physiologic response data of the individual,
   (b) a feedback mechanism operably connected with the computer, and the computer communicates with the individual after analysis of the individual's physiologic reaction to the stimuli,
   wherein the product of manufacture, device or system is configured to: filter the EEG data using an anti-aliasing low pass filter at about 130 Hz and digitized at about 500 Hz with about 24 bits of resolution;
   re-reference the EEG data to the average of signals obtained from TP9 and TP10 locations, and band-pass filter between about 0.1 and 30 Hz, comprising a non-causal Butterworth impulse response function, half-amplitude cut-off, and about 12 dB/oct roll-off;
   segment the EEG data for a trial beginning about 500 milliseconds (ms) prior to the physiologic response and continuing for about 1000 ms post physiologic response; or
   baseline correct data using a time period of between about −500 ms to −300 ms prior to the physiologic response.

2. The product of manufacture, device or system of claim 1, wherein the feedback data is fed or transmitted to a remote computer for analysis.

3. The product of manufacture, device or system of claim 1, wherein the feedback data from the computer to the individual is visual-based or aural-based data.

4. The product of manufacture, device or system of claim 1, wherein the EEG apparatus comprises active electrodes selected from the group consisting of: Fp1, Fz, F3, F7, FT9, FC3, FC1, C3, T7, TP9, CP5, CP1, P3, P7, O1, Oz, O2, P4, P8, TP10, CP6, CP2, Cz, C4, T8, FT10, FC6, FC2, F4, F8, and Fp2, using a subset of the International 10-20 system, referenced to Cz and with a ground electrode configured to be placed at FPz.

5. The product of manufacture, device or system of claim 1, wherein the neurofeedback mechanism system further comprises a vertical electrooculogram (EOG) apparatus, wherein the vertical EOG apparatus comprises at least two electrodes, and the vertical EOG apparatus is configured to record reactions and responses by the individual to the stimuli using the at least two electrodes when the at least two electrodes are placed above and below an eye.

6. The product of manufacture, device or system of claim 1, configured to filter the EEG data using an anti-aliasing low pass filter at 130 Hz and digitized at 500 Hz with 24 bits of resolution.

7. The product of manufacture, device or system of claim 1, configured to re-reference the EEG data to the average of signals obtained from electrodes configured to be placed at the TP9 and TP10 locations located adjacent to the mastoids and band-pass filter between 0.1 and 30 Hz, comprising a non-causal Butterworth impulse response function, half-amplitude cut-off, and 12 dB/oct roll-off.

8. The product of manufacture, device or system of claim 1, configured to re-reference the EEG data to the average of signals obtained from electrodes configured to be placed at the TP9 and TP10 locations located adjacent to the mastoids.

9. The product of manufacture, device or system of claim 1, configured to segment the EEG data beginning 500 milliseconds (ms) prior to the physiologic response from the individual and continuing for 1000 ms after the physiologic response from the individual.

10. The product of manufacture, device or system of claim 9, configured to baseline correct data using a time period of between about −500 ms to −300 ms prior to the physiologic response from the individual to the stimuli generated by the computer.

11. The product of manufacture, device or system of claim 1, further comprising a feedback mechanism, wherein the feedback mechanism comprises a mouse operatively linked to the computer.

12. The product of manufacture, device or system of claim 1, wherein the stimuli transmitted by the computer to the individual comprises a visual cue, or an aural cue.

13. A product of manufacture, device or system comprising:
(a) an electro-encephalography (EEG) apparatus configured to be operatively linked to a computer and to an individual,
wherein the EEG apparatus is configured to measure a physiologic response by the individual to a stimuli transmitted by the computer, and the EEG apparatus transmits EEG data encompassing the physiologic response by the individual back to the computer,
wherein the computer is configured to give the stimuli to the individual, and if the individual has the physiologic response to the stimuli that physiologic response is read by the EEG apparatus and EEG data is generated measuring the physiologic response, and this data is transmitted to the computer, which then provides feedback based on the physiologic response of the individual,
wherein the product of manufacture, device or system is configured to filter the EEG data using an anti-aliasing low pass filter at about 130 Hz and digitized at about 500 Hz with about 24 bits of resolution;
wherein the product of manufacture, device or system is configured to re-reference the EEG data to the average of signals obtained from TP9 and TP10 locations, and band-pass filter between about 0.1 and 30 Hz, comprising a non-causal Butterworth impulse response function, half-amplitude cut-off, and about 12 dB/oct roll-off;
wherein the product of manufacture, device or system is configured to segment the EEG data beginning about 500 milliseconds (ms) prior to the physiologic response from the individual and continuing for about 1000 ms after the physiologic response from the individual; and
wherein the product of manufacture, device or system is configured to baseline correct data using a time period of between about −500 ms to −300 ms prior to the physiologic response.

* * * * *